US012043033B2

(12) United States Patent
Miyajima et al.

(10) Patent No.: US 12,043,033 B2
(45) Date of Patent: Jul. 23, 2024

(54) LIQUID EJECTING HEAD AND LIQUID EJECTING APPARATUS

(71) Applicant: SEIKO EPSON CORPORATION, Tokyo (JP)

(72) Inventors: Hiroki Miyajima, Matsumoto (JP); Kazuya Tajima, Shiojiri (JP); Yuji Shingu, Shiojiri (JP); Yasuyuki Kudo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 17/664,235

(22) Filed: May 20, 2022

(65) Prior Publication Data

US 2022/0371320 A1 Nov. 24, 2022

(30) Foreign Application Priority Data

May 20, 2021 (JP) ................................ 2021-085144

(51) Int. Cl.
*B41J 2/045* (2006.01)
*B41J 29/377* (2006.01)

(52) U.S. Cl.
CPC .......... *B41J 2/04581* (2013.01); *B41J 29/377* (2013.01)

(58) Field of Classification Search
CPC ........ B41J 2/04581; B41J 29/377; B41J 2/18; B41J 2002/14362; B41J 2002/14419; B41J 2002/14491; B41J 2/14274
USPC ........................................................... 347/18
See application file for complete search history.

(56) References Cited

U.S. PATENT DOCUMENTS

2016/0185144 A1* 6/2016 Arimura ................ B41J 29/377 347/20
2018/0086054 A1* 3/2018 Abe ..................... B41J 2/04541
2020/0130388 A1* 4/2020 Saito .......................... B41J 2/14

FOREIGN PATENT DOCUMENTS

JP 2000-218781 A 8/2000
JP 2009-160895 A 7/2009
JP 2016-000488 A 1/2016

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A liquid ejecting head includes a first drive circuit including a switching element that selects, from a plurality of drive elements, a drive element to which a drive signal for ejection of liquid through a nozzle is sent, a case defining a first accommodating portion that is a space accommodating the first drive circuit, and a first gas supply passage that is in communication with the first accommodating portion and through which gas is supplied to the first accommodating portion.

20 Claims, 14 Drawing Sheets

LIQUID EJECTING HEAD AND LIQUID EJECTING APPARATUS

The present application is based on, and claims priority from JP Application Serial Number 2021-085144, filed May 20, 2021, the disclosure of which is hereby incorporated by reference herein in its entirety.

BACKGROUND

1. Technical Field

The present disclosure relates to a liquid ejecting head and a liquid ejecting apparatus.

The present disclosure relates to a liquid ejecting head that ejects liquid through nozzles and a liquid ejecting apparatus, particularly to an ink jet recording head that ejects ink in the form of liquid and an ink jet recording apparatus.

2. Related Art

For example, an ink jet recording head (hereinafter, may be simply referred to as a recording head), which is a typical example of a liquid ejecting head that ejects liquid droplets, includes a channel board having a pressure chamber and a drive element such as a piezoelectric actuator on a surface of the channel board. When the drive element is deformed, a pressure is applied to the pressure chamber, allowing ejection of ink droplets through the nozzles. Such an ink jet recording head is described in JP-A-2016-488, for example.

Drive elements are selectively driven by power selectively supplied through a drive circuit such as a drive IC. For example, the drive circuit includes a switching element that selects a drive element to which a drive signal is sent.

In the recording head including a drive circuit having the switching element, when the drive element is driven, the temperature of the recording head may be increased by, for example, heat generated by the drive circuit. The increased temperature may cause a breakdown of the recording head. In particular, when the recording head is a large recording head having a relatively large number of nozzles, the drive circuit generates more heat, and thus the temperature of the recording head is more likely to increase. This raises the temperature of the ink in the recording head and decreases the viscosity of the ink. The decreased viscosity of ink adversely affects the ejection properties, possibly leading to a decrease in print quality. Furthermore, heat of the drive circuit generated during a printing operation may raise the temperature of the drive circuit to a predetermined temperature. In such a case, the drive circuit needs to stop operating until the drive circuit is cooled down to a predetermined temperature to prevent a thermal breakdown of the drive circuit. This leads to a decrease in throughput of the printing operation.

To solve the above-described problems, the recording head or the drive circuit may be cooled to reduce the increase in temperature of the recording head. For example, a duct may be disposed to send air toward the ink jet head to prevent the increase in temperature of the body of the ink jet head or temperature of the circuit board on the ink jet head (for example, see JP-A-2009-160895).

The drive circuit may be disposed, for example, on a surface of the recording head. In such a case, the configuration described in JP-A-2009-160895 can prevent an increase in temperature of the recording head or the drive circuit. However, the drive circuit may be disposed in a space in the recording head. In such a case, the drive circuit may be insufficiently cooled by only air sent toward the recording head.

The above-described problem is inherent in any ink jet recording head. Such a problem is inherent in not only an ink jet recording head that ejects ink but also in a liquid ejecting head that ejects liquid other than ink.

SUMMARY

According to an aspect of the present disclosure, a liquid ejecting head includes a first drive circuit including a switching element that selects, from a plurality of drive elements, a drive element to which a drive signal for ejection of liquid through a nozzle is sent, a case defining a first accommodating portion that is a space accommodating the first drive circuit, and a first gas supply passage that is in communication with the first accommodating portion and through which gas is supplied to the first accommodating portion.

According to another aspect of the present disclosure, a liquid ejecting apparatus includes the above-described liquid ejecting head and a gas sending mechanism coupled to the first gas supply passage and configured to send gas to the first gas supply passage.

DESCRIPTION OF EXEMPLARY EMBODIMENTS

Figure 1:
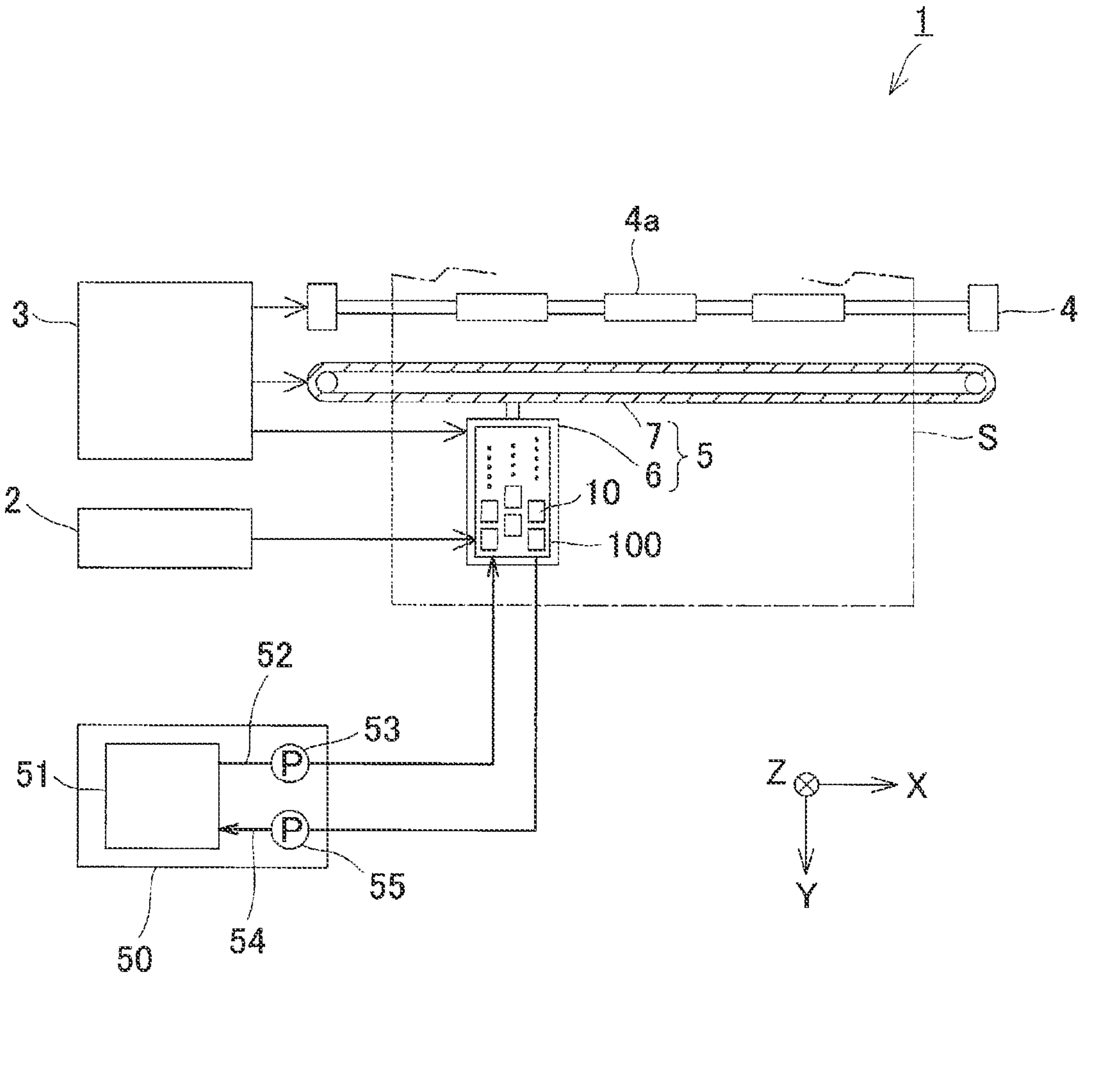
FIG. 1 is a schematic view illustrating a recording apparatus according to a first embodiment of the present disclosure.

Hereinafter, an embodiment of the present disclosure will be described in detail with reference to the drawings. However, the following is only a description of an aspect of the present disclosure. Any modification can be made to the configuration of the present disclosure within the scope of the present disclosure.

In the drawings, the same reference numerals are assigned to the same components without duplicated explanation. In the drawings, X, Y, and Z represent three orthogonal spatial axes. In this specification, directions along the X, Y, and Z axes are, respectively, referred to as X, Y, and Z directions. The directions pointed by the arrows in the drawings are referred to as positive (+) directions and directions opposite the directions pointed by the arrows are referred to as negative (−) directions. The Z direction corresponds to the vertical direction. The +Z direction corresponds to a vertically downward direction and the −Z direction corresponds to a vertically upward direction. The three spatial axes of X, Y, and Z without limitation of positive and negative directions are referred to as X, Y, and Z axes.

First Embodiment

FIG. 1 is a schematic view illustrating an ink jet recording apparatus as an example of a liquid ejecting apparatus according to an aspect of the present disclosure.

The ink jet recording apparatus according to an aspect of the present disclosure (hereinafter, may be simply referred to as a "recording apparatus") is a printer that ejects ink, which is an example of liquid, in the form of ink droplets onto a medium such as a printing sheet to form a dot matrix on the medium to print an image, for example. The medium is not limited to a recording sheet and may be any medium such as a resin film and a cloth.

As illustrated in FIG. 1, a recording apparatus 1 includes a liquid container 2, a control unit 3, a transportation mechanism 4, a movement mechanism 5, and a head unit 100 including ink jet recording heads (hereinafter, may be simply referred to as "recording heads") 10. The ink jet recording head 10 is an example of a liquid ejecting head. The head unit 100 does not need to have multiple recording heads 10 and may include only one recording head 10.

The liquid container 2 separately stores different kinds (for example, different colors) of ink to be ejected from the recording head 10. Examples of the liquid container 2 include a cartridge detachable from the recording apparatus 1, an ink pack that is a pouch formed of a flexible film, and an ink tank refillable with ink. The liquid container 2 stores different kinds of ink having different colors or different compositions, for example.

The control unit 3 includes, for example, a controller such as a central processing unit (CPU) and a field programmable gate array (FPGA), and memory such as semiconductor memory. The controller executes programs stored in the memory, and thus the control unit 3 collectively controls the components of the recording apparatus 1 such as the transportation mechanism 4, the movement mechanism 5, and the recording head 10.

The transportation mechanism 4 transports a medium S in the Y axis direction under the control of the control unit 3 and includes a transportation roller 4*a*. The transportation mechanism 4 transports the medium S in the Y axis direction when the transportation roller 4*a* is rotated. The transportation mechanism 4, which transports the medium S, does not need to include the transportation roller 4*a* and may include, for example, a belt or a drum to transport the medium S.

The movement mechanism 5 reciprocates the head unit 100, which includes the recording heads 10, in the X axis direction under the control of the control unit 3. The X axis direction in which the head unit 100 is reciprocated by the movement mechanism 5 is a direction intersecting the Y axis direction in which the medium S is transported.

Specifically described, the movement mechanism 5 of this embodiment includes a transportation member 6 and a transportation belt 7. The transportation member 6 is a box-like member that houses the head unit 100, or a carriage, and is fixed to the transportation belt 7. The transportation belt 7 is an endless belt that extends in the X axis direction. The head unit 100 is reciprocated in the X axis direction together with the transportation member 6 by rotation of the transportation belt 7 controlled by the control unit 3. The transportation member 6 may have the liquid container 2 in addition to the head unit 100.

The recording heads 10 included in the head unit 100 each eject ink, which is supplied from the liquid container 2, through nozzles onto the medium S. In the recording apparatus 1, while the medium S is transported by the movement mechanism 5 and the transportation member 6 is repeatedly reciprocated, the recording heads 10 eject ink onto the medium S, and thus an image is formed on a surface of the medium S.

The recording apparatus 1 includes a gas sending mechanism 50 to supply cooling gas into the recording heads 10. This will be described later in detail.

Next, the configuration of the recording head 10 included in the head unit 100 will be described.

Figure 2:
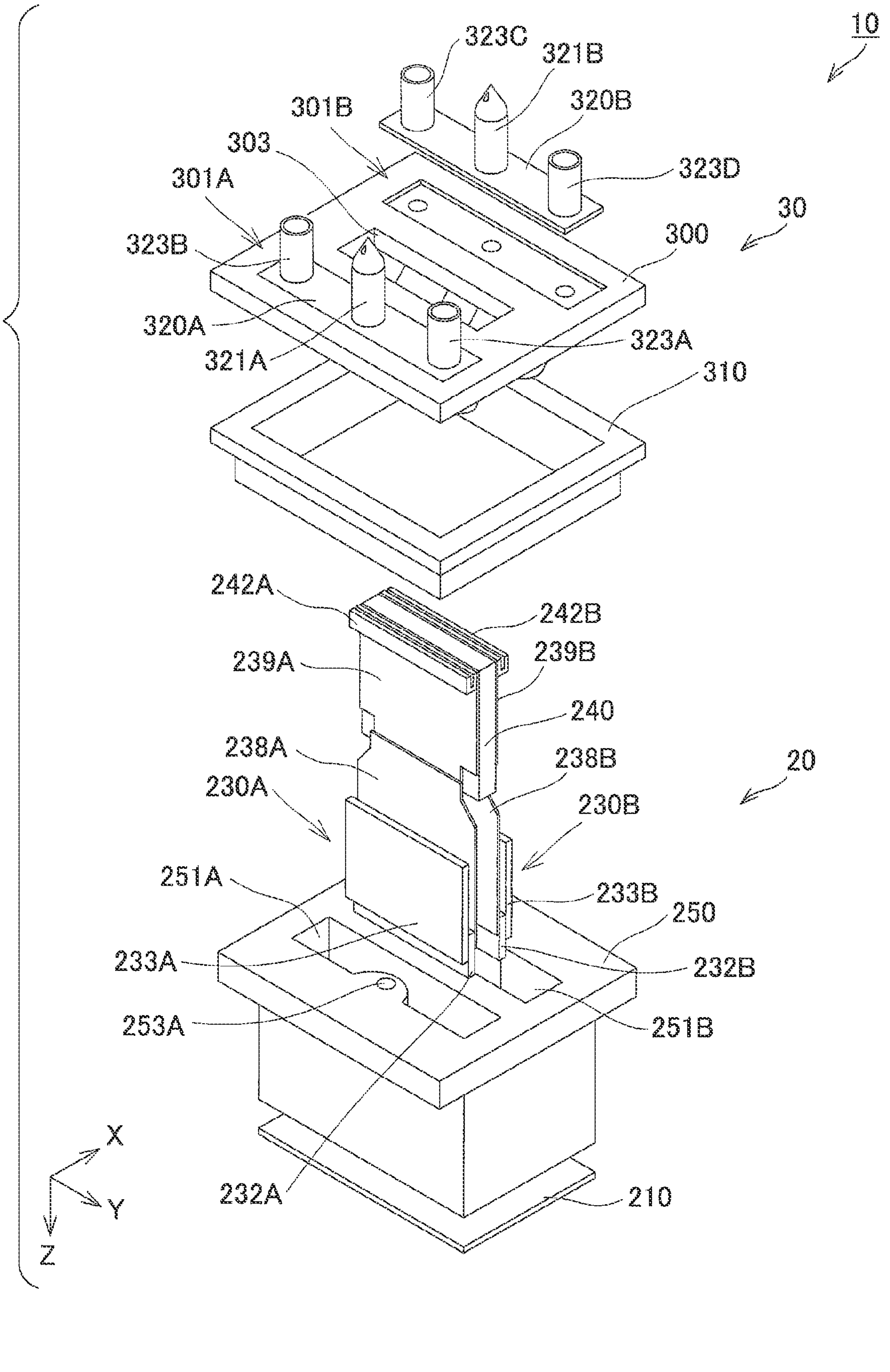
FIG. 2 is an exploded perspective view illustrating a schematic configuration of a recording head according to the first embodiment of the present disclosure.
Figure 3:
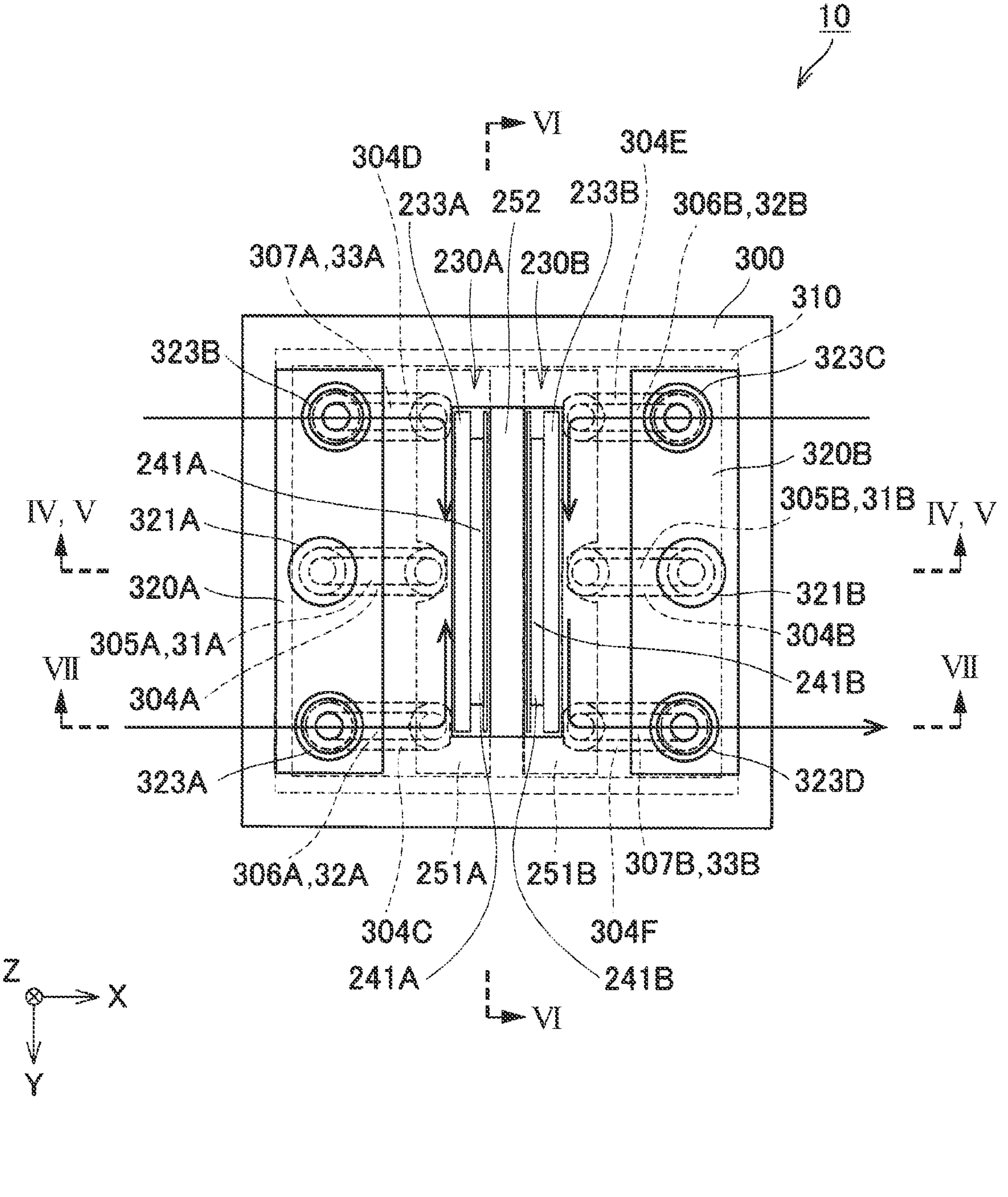
FIG. 3 is a top view illustrating a schematic configuration of the recording head according to the first embodiment of the present disclosure.
Figure 4:
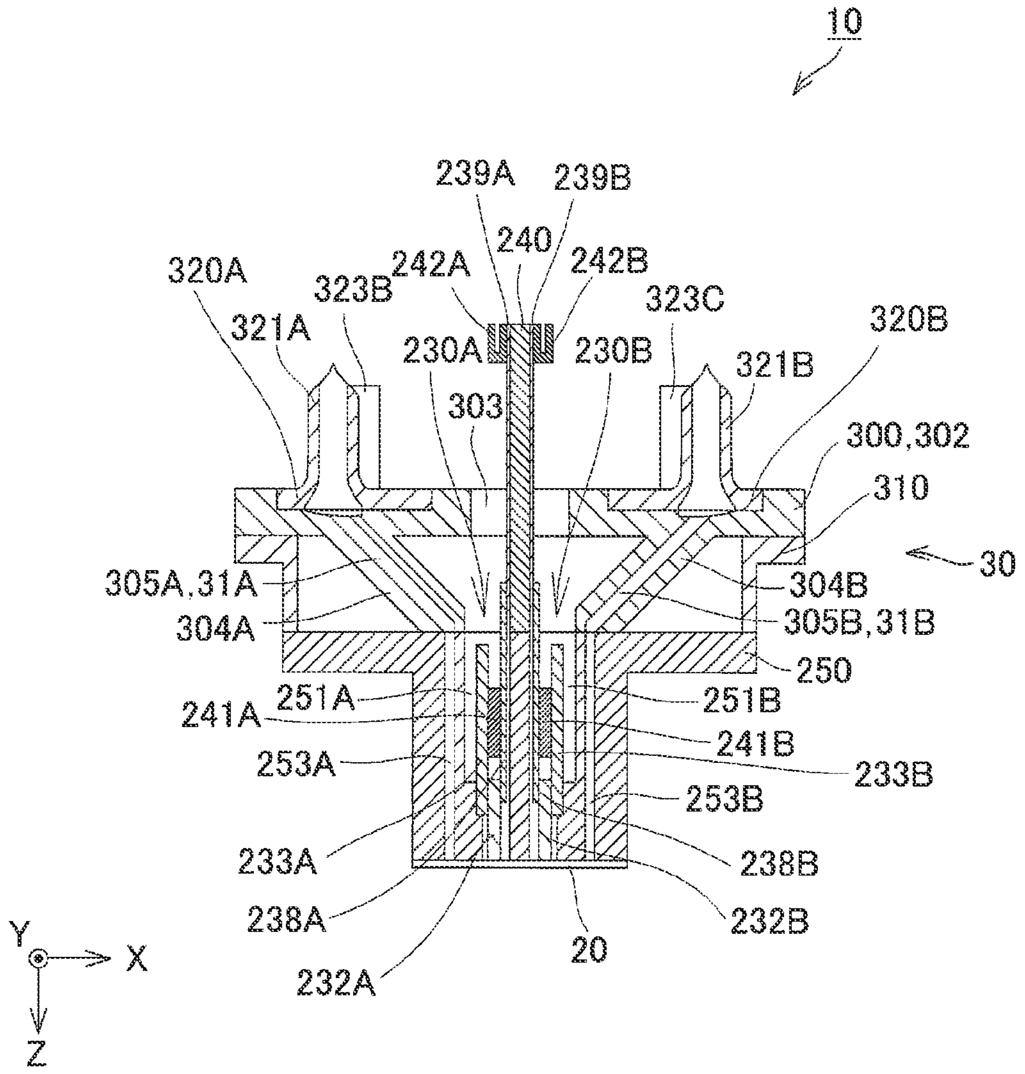
FIG. 4 is a cross-sectional view illustrating a schematic configuration of the recording head according to the first embodiment of the present disclosure.
Figure 5:
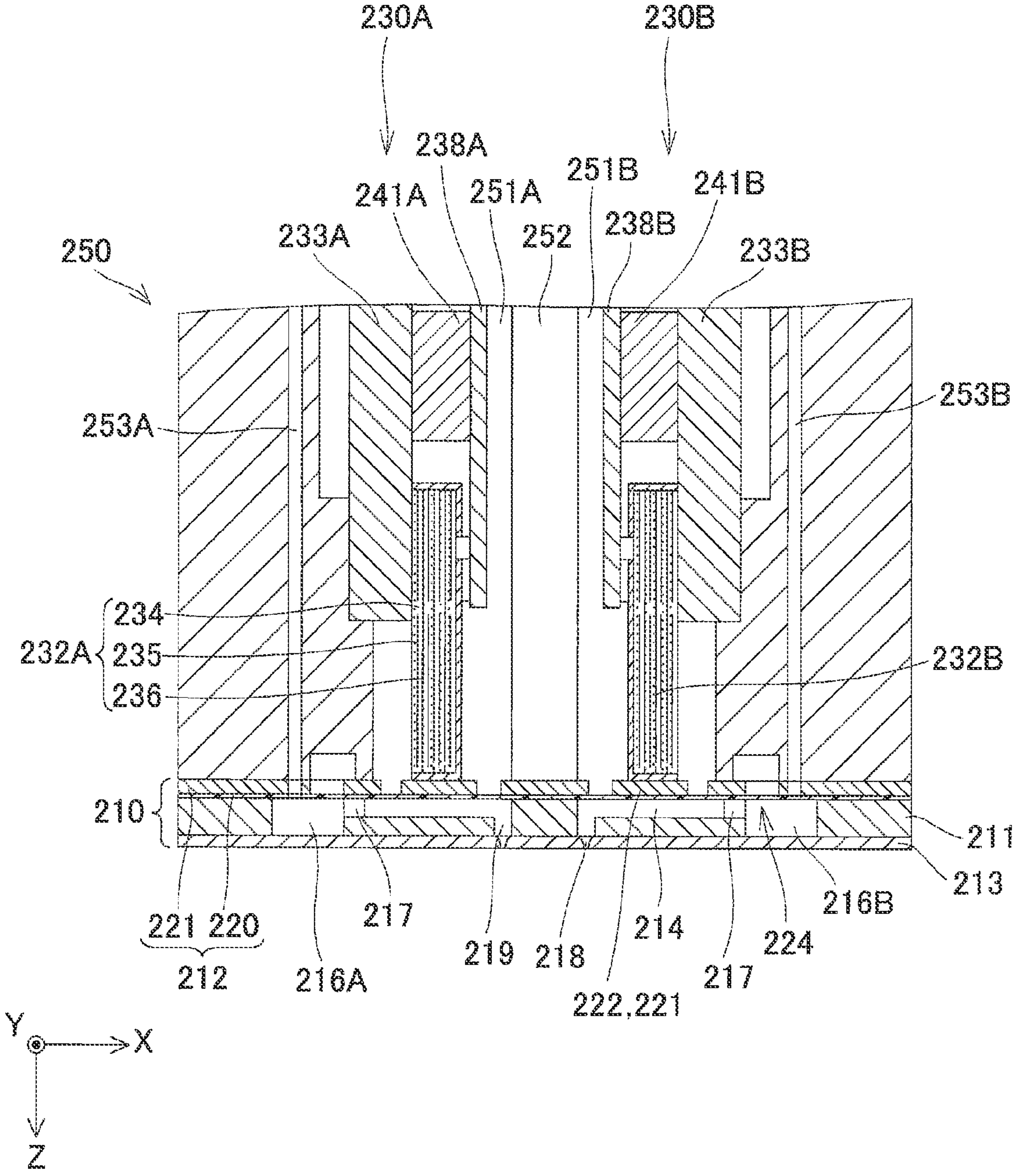
FIG. 5 is a magnified cross-sectional view illustrating a schematic configuration of the recording head according to the first embodiment of the present disclosure.
Figure 6:
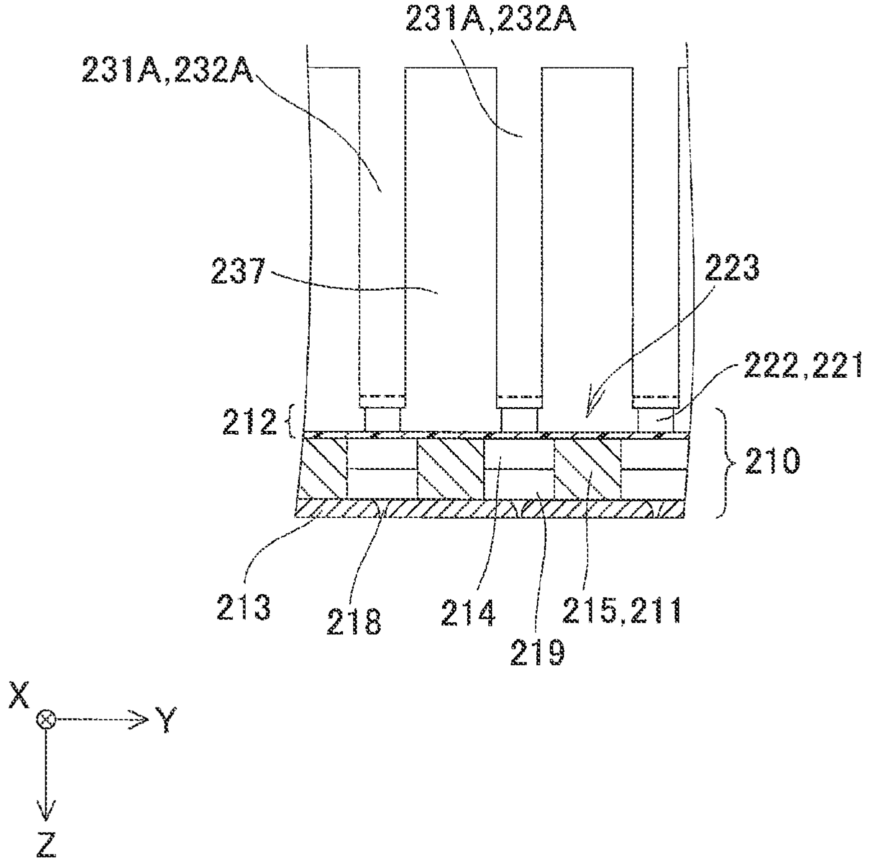
FIG. 6 is a magnified cross-sectional view illustrating a schematic configuration of the recording head according to the first embodiment of the present disclosure.
Figure 7:
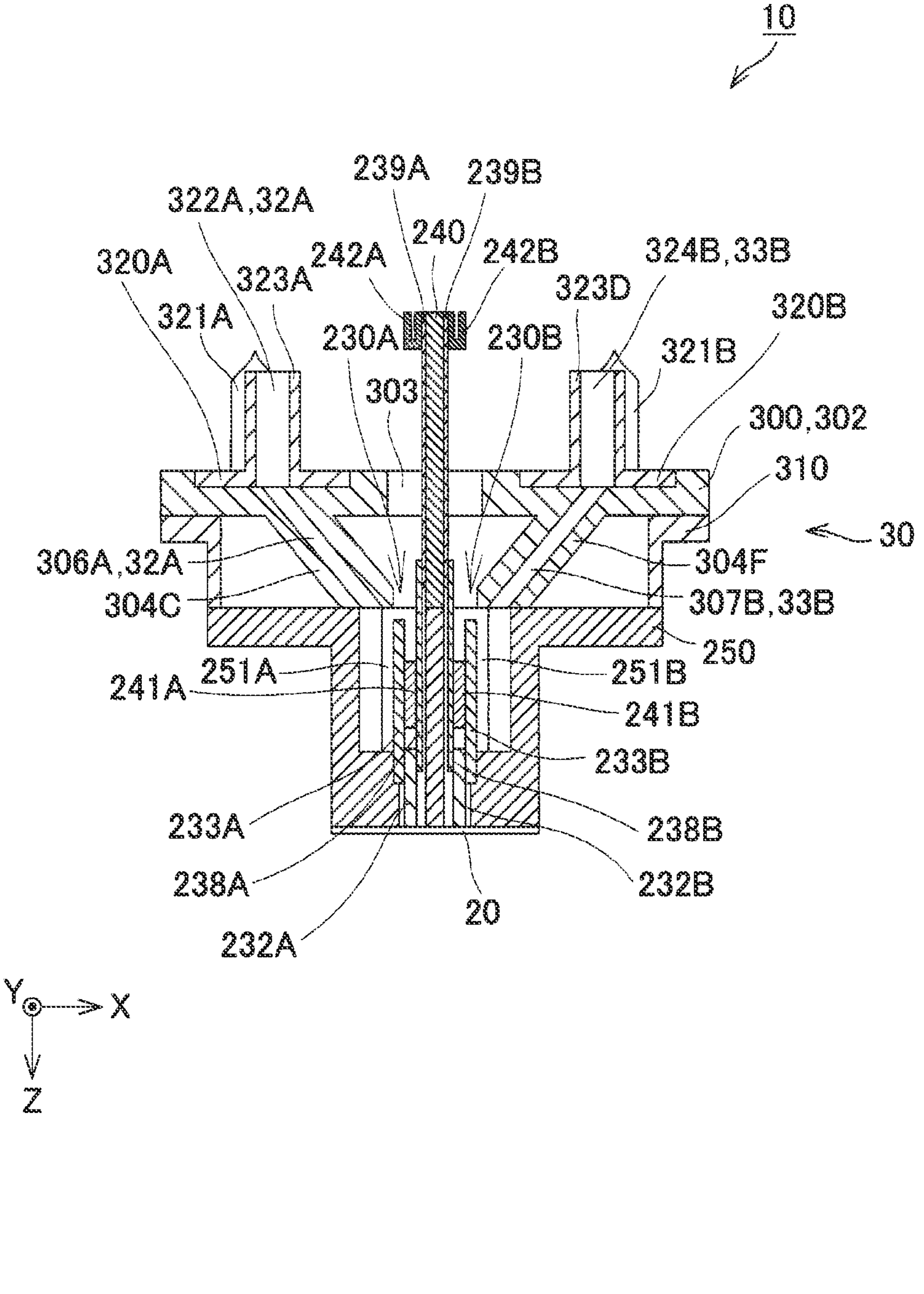
FIG. 7 is a cross-sectional view illustrating a schematic configuration of the recording head according to the first embodiment of the present disclosure.
Figure 8:
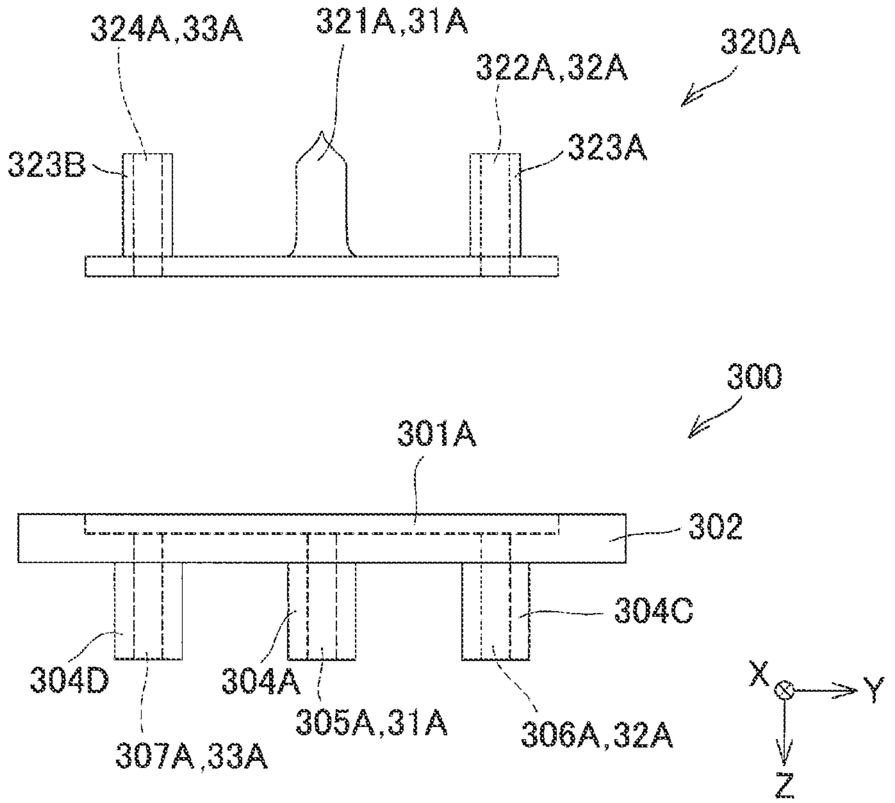
FIG. 8 is a side view illustrating a schematic configuration of the recording head according to the first embodiment of the present disclosure.
Figure 9:
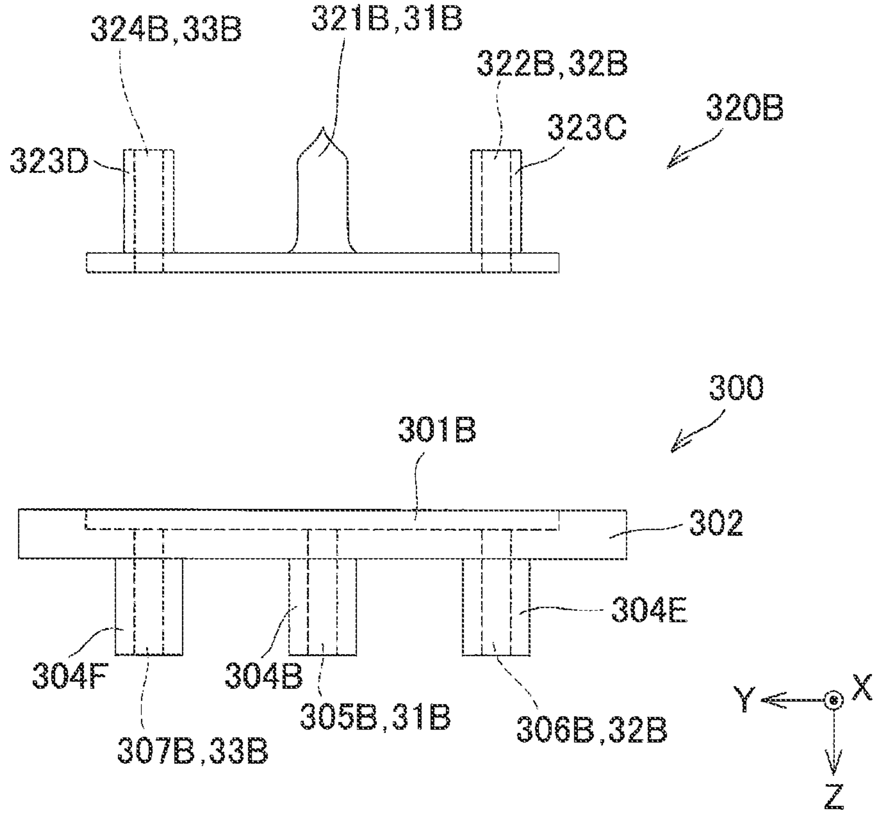
FIG. 9 is a side view illustrating a schematic configuration of the recording head according to the first embodiment of the present disclosure.

FIG. 2 is an exploded perspective view illustrating a schematic configuration of the recording head 10. FIG. 3 is a top view illustrating a schematic configuration of the recording head 10. In FIG. 3, wiring members 239A and 239B and a holder 240 are not illustrated. FIG. 4 is a cross-sectional view illustrating a schematic configuration of the recording head 10 and taken along line IV-IV in FIG. 3. FIGS. 5 and 6 are magnified cross-sectional views illustrating a schematic configuration of the recording head 10. FIG. 5 is a view taken along line V-V in FIG. 3. FIG. 6 is a view taken along line VI-VI in FIG. 3. FIG. 7 is a cross-sectional view illustrating a schematic configuration of the recording head 10 and taken along line VII-VII in FIG. 3. FIGS. 8 and 9 are side views illustrating a first member 300 and a coupling unit 320 included in a supply passage member 30.

As illustrated in FIGS. 2 to 9, the recording head 10 includes a head member 20, which ejects ink as an example of liquid, and the supply passage member 30 fixed to the head member 20.

The head member 20 includes a passage unit 210, an actuator unit 230 including multiple piezoelectric actuators 231, and a case 250 accommodating the actuator unit 230.

As illustrated in FIGS. 5 and 6, the passage unit 210 has a passage to which ink in the form of liquid is supplied. The passage unit 210 includes a passage formation substrate 211, a vibration plate 212, and a nozzle plate 213. The passage formation substrate 211, the vibration plate 212, and the nozzle plate 213 are stacked on top of another in the Z axis direction.

The passage formation substrate 211 is, for example, a single crystal silicon substrate and has pressure chambers 214. In this embodiment, the passage formation substrate 211 has two pressure chamber arrays in each of which the pressure chambers 214 are arranged in the Y axis direction. The arrays adjacent to each other in the X axis direction are staggered. In the passage formation substrate 211, two pressure chambers 214 adjacent to each other in the X axis direction are staggered and multiple pressure chambers 214 arranged in the Y axis direction are in line.

The pressure chambers 214 included in the respective pressure chamber arrays are arranged in a straight line in the Y axis direction at the same position in the X axis direction. The pressure chambers 214 adjacent to each other in the Y axis direction are separated by a partition wall 215. However, the arrangement of the pressure chambers 214 is not limited to this.

The pressure chamber 214 in this embodiment is longer in the X axis direction than in the Y axis direction and has, for example, a rectangular shape. The shape of the pressure chamber 214 in plan view in the Z axis direction is not limited and may be a parallelogram, a polygon, a circle, or an oval, for example. Herein, the oval is a shape having a rectangular base and semicircular longitudinal ends. Examples of the oval include a rounded rectangle, an ellipse, and an egg-like shape.

The passage formation substrate 211 includes, at positions adjacent to ends in the X axis direction of the pressure chambers 214, manifolds 216 to supply ink to the pressure chambers 214 and individual passages 217 through which the pressure chambers 214 and the manifolds 216 are in communication with each other. In this embodiment, the manifolds 216 are independently disposed for the respective arrays of the pressure chambers 214. Specifically described, the passage formation substrate 211 includes a first manifold 216A and a second manifold 216B for the respective arrays of the pressure chambers 214.

The passage formation substrate 211 having such a configuration has the vibration plate 212 on one surface and the nozzle plate 213 on the other surface. The surface of the passage formation substrate 211 facing in the −Z direction and having openings of the pressure chambers 214 is sealed by the vibration plate 212. The surface of the passage formation substrate 211 facing in the +Z direction is covered by the nozzle plate 213. The nozzle plate 213 has nozzles 218 extending therethrough and provided for the pressure chambers 214. The nozzle 218 and the pressure chamber 214 are in communication with each other through a nozzle communication hole 219 extending through the passage formation substrate 211 in the Z axis direction.

The vibration plate 212 is a composite plate including an elastic film 220, such as a resin film formed of an elastic material, and a support plate 221 supporting the elastic film 220 and formed of, for example, a metal material. The elastic film 220 is coupled to the passage formation substrate 211. The resin film forming the elastic film 220 may be formed of polyphenylene sulfide (PPS). The metal material forming the support plate 221 may be stainless steel (SUS).

The vibration plate 212 have island portions 222 in areas opposed to the pressure chambers 214. The piezoelectric actuators 231 (described later) are in contact with the island portions 222 at the front ends. The vibration plate 212 has thinner portions 223 that are thinner than the other portions in areas opposed to portions around the pressure chambers 214 and thus has the island portions 222 at positions inwardly from the thinner portions 223. In this embodiment, the support plate 221 is partially etched and removed to form the thinner portions 223. The thinner portions 223 are portions of the vibration plate 212 that are opposed to the pressure chambers 214 and formed only of the elastic film 220.

The support plate 221 has compliance portions 224 that are, as the thinner portions 223, formed by partial etching and removal of the support plate 221 and virtually formed of the elastic film 220 in areas opposed to the manifolds 216 of the vibration plate 212 or the first and second manifold 216A and 216B. When a pressure in the manifolds 216 is changed, the elastic film 220 included in the compliance portion 224 is deformed to absorb the pressure change, keeping the pressure in the manifolds 216 at a constant pressure.

As illustrated in FIG. 2, for example, the head member 20 includes the actuator unit 230 having the piezoelectric actuators 231 for the respective pressure chambers 214. In this embodiment, the passage formation substrate 211 has two arrays of the pressure chambers 214, and thus the head member 20 includes, as the actuator unit 230, a first actuator unit 230A and a second actuator unit 230B for the respective arrays.

The first actuator unit 230A includes a piezoelectric actuator formation member 232A integrally including piezoelectric actuators 231A and a fixing plate 233A to which the piezoelectric actuator formation member 232A is fixed. Similarly, the second actuator unit 230B includes a piezoelectric actuator formation member 232B integrally including piezoelectric actuators 231B and a fixing plate 233B to which the piezoelectric actuator formation member 232B is fixed.

The fixing plate 233A and the fixing plate 233B are long plates elongated in the Y axis direction and are formed of a material having a thermal conductivity of not less than 10.0 W/m·K, such as a metal material. The fixing plate 233A of this embodiment is formed of stainless steel but may be formed of aluminum or titanium, for example. The fixing plate 233B should be formed of the same material as the fixing plate 233A. In the following description, when the fixing plate 233A and the fixing plate 233B do not need to be distinguished from each other, they may be simply referred to as fixing plates 233.

The first actuator unit 230A and the second actuator unit 230B have the same structure. Thus, the first actuator unit 230A will be described here and the second actuator unit 230B will not be described.

As illustrated in FIGS. 5 and 6, the piezoelectric actuators 231A are integrally included in the piezoelectric actuator formation member 232A. In other words, the piezoelectric actuator formation member 232A integrally includes the piezoelectric actuators 231A arranged in the X axis direction.

The piezoelectric actuator formation member 232A includes alternating layers of a piezoelectric body 234, an individual internal electrode 235, and a common internal electrode 236. The individual internal electrode 235 and the common internal electrode 236 are internal electrodes constituting two poles of the piezoelectric actuator 231A. The individual internal electrode 235 is an individual electrode electrically independent from the adjacent piezoelectric actuator 231A. The common internal electrode 236 is a common electrode electrically common with the adjacent piezoelectric actuator 231A.

The piezoelectric actuator formation member 232A has slits 237 formed by, for example, a wire saw, at the end in the +Z direction. The piezoelectric actuator formation member 232A has a comb-like shape due to the slits 237 at the end in the +Z direction. The sections of the piezoelectric actuator formation member 232A separated by the slits 237 function as the piezoelectric actuators 231A. The piezoelectric actuator 231A is an example of the "drive element". The piezoelectric actuator formation member 232A includes the piezoelectric actuators 231A arranged in the Y axis direction.

The piezoelectric actuator formation member 232A is fixed, at a portion near the end in the −Z direction, to the fixing plate 233A. The piezoelectric actuator formation member 232A is coupled to the fixing plate 233A such that the end in the +Z direction, which has the piezoelectric actuators 231A, become a free end. In this configuration, when a voltage is applied between the individual internal electrode 235 and the common internal electrode 236, which constitute the piezoelectric actuators 231A, front ends of the piezoelectric actuators 231A, which are not coupled to the fixing plate 233A, are vibrated.

As illustrated in FIG. 2, for example, a wiring member 238A, such as flexible printed circuits (FPC), is coupled to the first actuator unit 230A having such a configuration. The wiring member 238A is coupled to the piezoelectric actuators 231A of the first actuator unit 230A. Furthermore, a wiring member 239A such as FPCs is coupled to the wiring member 238A. A print signal, for example, is inputted to the wiring member 238A through the wiring member 239A. The wiring member 239A is held by a holder 240 fixed to the case 250. As illustrated in FIG. 7, for example, a connector 242A is disposed at an end in the −Z direction of the wiring member 239A. The connector 242A is electrically coupled to an external signal cable such as a flexible flat cable (FFC) disposed outside the recording head 10 to enable the recording head 10 to receive signals such as a print signal from the control unit 3.

The wiring member 238A has a first drive circuit 241A, which is a drive IC, for example. In this embodiment, the wiring member 238A and the first drive circuit 241A constitute a chip on film (COF). The first drive circuit 241A supplies a drive signal to a predetermined piezoelectric actuator 231A upon receipt of a print signal through the wiring member 239A. The first drive circuit 241A includes switching elements for the piezoelectric actuators 231A and uses the switching elements to selectively apply a voltage to a predetermine piezoelectric actuator 231A upon receipt of a print signal through the wiring member 239A. In short, the first drive circuit 241A selectively drives the piezoelectric actuators 231A upon receipt of a print signal.

As the first actuator unit 230A, a wiring member 238B having a second drive circuit 241B is coupled to the second actuator unit 230B and a wiring member 239B is coupled to the wiring member 238B. The wiring member 238B and the second drive circuit 241B constitute a COF.

As illustrated in FIG. 7, for example, the wiring member 239B has a connector 242B at an end in the −Z direction as the wiring member 239A. The connector 242A for the wiring member 239A and the connector 242B for the wiring member 239B may be separate connectors or may be one connector. The second drive circuit 241B includes switching elements for the piezoelectric actuators 231B and uses the switching elements to selectively apply a voltage to a predetermined piezoelectric actuator 231B upon receipt of a print signal through the wiring member 239B.

The first drive circuit 241A has a shape elongated in the Y axis and the surface facing in the −X direction is in contact with the fixing plate 233A. The first drive circuit 241A and the fixing plate 233A may be fixed together by thermal conductive grease, adhesive, or pressure-sensitive adhesive, for example. The second drive circuit 241B has a shape elongated in the Y axis as the first drive circuit 241A and the surface facing in the +X direction is in contact with the fixing plate 233B. The second drive circuit 241B and the fixing plate 233B may be fixed together by thermal conductive grease, adhesive, or pressure-sensitive adhesive, for example.

The case 250 accommodating the actuator units 230 is adjacent to the passage unit 210 in the −Z direction. In other words, the case 250 is coupled to the upper surface of the vibration plate 212 coupled onto the passage formation substrate 211.

The case 250 defines a accommodating portion 251 accommodating the actuator units 230. As described above, the head member 20 includes the first actuator unit 230A and the second actuator unit 230B. Thus, the case 250 has a first accommodating portion 251A that is a space accommodating the first actuator unit 230A having the first drive circuit 241A and a second accommodating portion 251B that is a space accommodating the second actuator unit 230B having the second drive circuit 241B. The first accommodating portion 251A and the second accommodating portion 251B extend through the case 250 in the Z axis direction and are arranged in the X axis direction with a partition wall 252 therebetween.

The first actuator unit 230A accommodated in the first accommodating portion 251A and the second actuator unit 230B accommodated in the second accommodating portion 251B are fixed to the case 250 at predetermined positions.

The case 250 has two liquid introduction passages 253 through which ink in the liquid container 2, which is an ink tank, for example, is supplied to the manifolds 216. The passage formation substrate 211 has the first and second manifolds 216A and 216B, and thus the case 250 has, as the liquid introduction passages 253, a first liquid introduction passage 253A through which ink is introduced to the first manifold 216A and a second liquid introduction passage 253B through which ink is introduced to the second manifold 216B.

The first liquid introduction passage 253A and the second liquid introduction passage 253B extend through the case 250 in the Z axis direction and are respectively in communication with the first manifold 216A and the second manifold 216B at one end. The first liquid introduction passage 253A is located at substantially the center of the case 250 in the Y axis direction and is located away from the first accommodating portion 251A in the −X direction of the X axis direction. The second liquid introduction passage 253B is located at substantially the center of the case 250 in the Y axis direction and is located away from the second accommodating portion 251B in the +X direction of the X axis direction.

The head member 20 having such a configuration receives ink from the liquid container 2 through a supply passage member 30, which will be described below. Ink in the liquid container 2 is introduced to the first liquid introduction passage 253A and the second liquid introduction passage 253B of the head member 20 through the supply passage member 30. The introduced ink fills the first liquid introduction passage 253A, the second liquid introduction passage 253B, and the nozzle 218. With the head member 20 being filled with ink, the recording head 10 selectively drives the piezoelectric actuators 231A and 231B to change the volume of the pressure chambers 214 such that ink droplets are ejected through predetermined nozzles 218.

The supply passage member 30 is adjacent to the case 250 in the −Z direction and, as illustrated in FIG. 4, for example, includes a first liquid supply passage 31A through which ink in the liquid container 2 is supplied to the first liquid introduction passage 253A of the case 250. Furthermore, the supply passage member 30 includes a second liquid supply passage 31B through which ink in the liquid container 2 is supplied to the second liquid introduction passage 253B of the case 250.

Furthermore, as illustrated in FIG. 7, for example, the supply passage member 30 includes a first gas supply passage 32A in communication with the first accommodating portion 251A and through which gas is supplied to the first accommodating 2 portion 51A and a first gas exhaust passage 33A in communication with the first accommodating portion 251A and through which gas in the first accommodating portion 251A is discharged outside. Furthermore, the supply passage member 30 includes a second gas supply passage 32B in communication with the second accommodating portion 251B and through which gas is supplied to the second accommodating portion 251B and a second gas exhaust passage 33B in communication with the second accommodating portion 251B and through which gas in the second accommodating portion 251B is discharged outside.

More specifically described, the supply passage member 30 of the present embodiment includes the first member 300, a second member 310, and the coupling unit 320.

The first member 300 has a portion of the first liquid supply passage 31A, a portion of the second liquid supply passage 31B, a portion of the first gas supply passage 32A, a portion of the second gas supply passage 32B, a portion of the first gas exhaust passage 33A, and a portion of the second gas exhaust passage 33B. This will be described in detail later.

The second member 310 is located between the first member 300 and the case 250 such that the second member 310 surrounds, in a top view of FIG. 3, the first accommodating 251A, a communication portion through which the first gas exhaust passage 33A and the first accommodating 251A are in communication with each other, the second accommodating 251B, and a communication portion through which the second gas exhaust passage 33B and the second accommodating 251B are in communication with each other. The second member 310 is fixed to the surface of the case 250 facing in the −Z direction. The second member 310 supports the first member 300 and limits leakage of gas that is supplied to the first and second accommodating portions 251A and 251B through the first and second gas supply passages 32A and 32B.

The coupling unit 320 is mounted on a surface of the first member 300 facing in the −Z direction and has a portion of the first liquid supply passage 31A, a portion of the second liquid supply passage 31B, a portion of the first gas supply passage 32A, a portion of the second gas supply passage 32B, a portion of the first gas exhaust passage 33A, and a portion of the second gas exhaust passage 33B.

Specifically described, the first member 300 includes a main body 302 having a mounting portion 301 in a surface facing in the −Z direction. The coupling unit 320 is mounted on the mounting portion 301.

The coupling unit 320 is disposed for each of the actuator units 230. In this embodiment, the supply passage member 30 includes a first coupling unit 320A for the first actuator unit 230A and a second coupling unit 320B for the second actuator unit 230B. Thus, the main body 302 of the first member 300 includes a first mounting portion 301A on which the first coupling unit 320A is mounted and a second mounting portion 301B on which the second coupling unit 320B is mounted.

The first mounting portion 301A is a recess recessed in the +Z direction in the surface of the main body 302 facing in the −Z direction. When a portion of the first coupling unit 320A fits in the recess, the first coupling unit 320A and the first mounting portion 301A are positioned. The second mounting portion 301B is a recess recessed in the +Z direction in the surface of the main body 302 facing in the −Z direction. When a portion of the second coupling unit 320B fits in the recess, the second coupling unit 320B and the second mounting portion 301B are positioned.

As illustrated in FIGS. 3 and 8, the first coupling unit 320A includes a first ink supply needle 321A that is hollow and constitutes a portion of the first liquid supply passage 31A, a first tubular portion 323A that has a first gas introduction portion 322A constituting the inlet of the first gas supply passage 32A, and a second tubular portion 323B that has a first gas exhaust portion 324A that is a hole constituting a portion of the first gas exhaust passage 33A. The first ink supply needle 321A, the first tubular portion 323A, and the second tubular portion 323B are arranged in the Y axis direction and integrated. The arrangement direction of the components is not limited. In this embodiment, the first tubular portion 323A having the first gas introduction portion 322A, the first ink supply needle 321A, and the second tubular portion 323B having the first gas exhaust portion 324A are arranged in this order from the +Y direction side toward the −Y direction side.

As illustrated in FIGS. 3 and 9, the second coupling unit 320B includes a second ink supply needle 321B that is hollow and constitutes a portion of the second liquid supply passage 31B, a third tubular portion 323C that has a second gas introduction portion 322B constituting a portion of the second gas supply passage 32B, and a fourth tubular portion 323D that has a second gas exhaust portion 324B constituting a portion of the second gas exhaust passage 33B. These components are arranged in the Y axis direction and integrated. The arrangement direction of the components is not limited. In this embodiment, the third tubular portion 323C having the second gas introduction portion 322B, the second ink supply needle 321B, and the fourth tubular portion 323D having the second gas exhaust portion 324B are arranged in this order from the −Y direction side toward the +Y direction side, which is opposite to the direction in which the components of the first coupling unit 320A are arranged.

The first coupling unit 320A having such a configuration is mounted on the first mounting portion 301A of the main body 302 of the first member 300, and the second coupling unit 320B is mounted on the second mounting portion 301B of the main body 302.

Thus, in the supply passage member 30, the first gas introduction portion 322A and the second gas exhaust portion 324B are arranged adjacent to each other in the X axis direction and the first gas exhaust portion 324A and the second gas introduction portion 322B are arranged adjacent to each other in the X axis direction (see FIG. 3).

The main body 302 has an insertion hole 303 between the first mounting portion 301A and the second mounting portion 301B. The insertion hole 303 extends through the main body 302 in the Z axis direction and receives the holder 240 holding the wiring members 239A and 239B. The insertion hole 303 at least has to be large enough to receive the holder 240 and the wiring members 239A and 239B. In this embodiment, the insertion hole 303 is large enough to receive the connectors 242A and 242B.

Although not illustrated in the drawings, a filter is disposed between the first member 300 and the first ink supply needle 321A and between the first member 300 and the second ink supply needle 321B. The filter has micropores to remove foreign substances and air bubbles from the ink in the form of liquid. The filter may be a microporous sheet that is formed of, for example, finely woven or knitted metal fibers or resin fibers or may be a microporous plate that is formed of, for example, metal or resin. The filter may be formed of a non-woven fabric. Alternatively, the material of the filter is not limited.

The first member 300 on which the first coupling unit 320A and the second coupling unit 320B are mounted further includes protrusions 304 protruding from the main body 302 in the +Z direction.

As illustrated in FIGS. 4, and 7 to 9, the first member 300 includes, as the protrusions 304 protruding from the main body 302, a first protrusion 304A having a portion of the first liquid supply passage 31A, a second protrusion 304B having a portion of the second liquid supply passage 31B, a third protrusion 304C having a portion of the first gas supply passage 32A, a fourth protrusion 304D having a portion of the second gas supply passage 32B, a fifth protrusion 304E having a portion of the first gas exhaust passage 33A, and a sixth protrusion 304F having a portion of the second gas exhaust passage 33B. The first member 300 is fixed to the case 250 with the second member 310 therebetween and with the protrusions 304 being in contact with the case 250.

An elastic sealing member (not illustrated) formed of, for example, elastomer may be disposed between the first protrusion 304A and the case 250 to liquid-tightly couple the first liquid supply passage 31A of the first protrusion 304A to the first liquid introduction passage 253A of the case 250. The same applies to the second protrusion 304B.

In this embodiment, the protrusions 304 independently protrude from the main body 302 but do not need to independently protrude. In other words, the protrusions 304 adjacent to each other may be integrated. Furthermore, the third protrusion 304C, the fourth protrusion 304D, the fifth protrusion 304E, and the sixth protrusion 304F may be away from the case 250 with a space therebetween.

As illustrated in FIGS. 4 and 8, the first protrusion 304A has a first through hole 305A constituting the first liquid supply passage 31A to which ink in the form of liquid is supplied from outside. The first through hole 305A extends axially through the first protrusion 304A. In short, the first protrusion 304A has a tubular shape and protrudes from the main body 302. The first through hole 305A is coupled to the first liquid introduction passage 253A of the case 250. The first through hole 305A extends through the main body 302 in addition to the first protrusion 304A and opens in the first mounting portion 301A. The first through hole 305A is coupled, at an end adjacent to the first mounting portion 301A, to the first ink supply needle 321A, which is mounted on the first mounting portion 301A.

The first ink supply needle 321A is away from the first liquid introduction passage 253A in the −X direction of the X axis direction. In this configuration, the first protrusion 304A is tilted downward toward the center in the X axis direction of the supply passage member 30.

As illustrated in FIGS. 4 and 9, for example, the second protrusion 304B has a second through hole 305B constituting the second liquid supply passage 31B to which ink in the form of liquid is supplied. The second through hole 305B extends axially through the second protrusion 304B. In short, the second protrusion 304B has a tubular shape and protrudes from the main body 302. The second through hole 305B is coupled to the second liquid introduction passage 253B of the case 250. Furthermore, the second through hole 305B extends through the main body 302 in addition to the second protrusion 304B and opens in the second mounting portion 301B. The second through hole 305B is coupled, at an end adjacent to the second mounting portion 301B, to the second ink supply needle 321B, which is mounted on the second mounting portion 301B.

The second ink supply needle 321B is away from the second liquid introduction passage 253B in the +X direction of the X axis direction. Thus, the second protrusion 304B is tilted downward toward the center in the X axis direction of the supply passage member 30.

As illustrated in FIGS. 7 and 8, for example, the third protrusion 304C has a first supply communication portion 306A that is a hole constituting the first gas supply passage 32A from which gas is supplied to the first accommodating portion 251A. The first supply communication portion 306A extends axially through the third protrusion 304C. In short, the third protrusion 304C has a tubular shape and protrudes from the main body 302. The first supply communication portion 306A is coupled to the first accommodating portion 251A of the case 250. Furthermore, the first supply communication portion 306A extends through the main body 302 in addition to the third protrusion 304C and opens in the first mounting portion 301A. The first supply communication portion 306A is coupled, at an end adjacent to the first mounting portion 301A, to the first gas introduction portion 322A of the first tubular portion 323A.

The first tubular portion 323A having the first gas introduction portion 322A is away from the first accommodating portion 251A in the −X direction of the X axis direction. In this configuration, the third protrusion 304C having the first supply communication portion 306A is tilted with respect to the Z axis direction, which is the direction in which the first tubular portion 323A having the first gas introduction portion 322A extends. In this embodiment, the third protrusion 304C is tilted downward toward the center in the X axis direction of the supply passage member 30.

Furthermore, in this embodiment, the third protrusion 304C extends, in a top view of FIG. 3, in the X axis direction substantially parallel to the first protrusion 304A, for example. The first supply communication portion 306A is coupled to an end portion in the +Y direction of the first accommodating portion 251A in the Y axis direction.

The fourth protrusion 304D has a first exhaust communication portion 307A that is a hole constituting the first gas exhaust passage 33A through which gas in the first accommodating portion 251A is discharged outside. The first exhaust communication portion 307A extends axially through the fourth protrusion 304D. In short, the fourth protrusion 304D has a tubular shape and protrudes from the main body 302. The first exhaust communication portion 307A is coupled to the first accommodating portion 251A of the case 250. Furthermore, the first exhaust communication portion 307A extends through the main body 302 in addition to the fourth protrusion 304D and opens to the first mounting portion 301A. The first exhaust communication portion

307A is coupled, at an end adjacent to the first mounting portion 301A, to the first gas exhaust portion 324A of the second tubular portion 323B.

The second tubular portion 323B having the first gas exhaust portion 324A is away from the first accommodating portion 251A in the −X direction of the X axis direction. In this configuration, the fourth protrusion 304D having the first exhaust communication portion 307A is tilted with respect to the Z axis direction or the direction in which the second tubular portion 323B having the first gas exhaust portion 324A extends. In this embodiment, the fourth protrusion 304D is tilted downward toward the center in the X axis direction of the supply passage member 30.

Furthermore, in this embodiment, the fourth protrusion 304D extends, in a top view of FIG. 3, in the X axis direction substantially parallel to the first protrusion 304A, for example. The first exhaust communication portion 307A is coupled to an end portion in the +Y direction of the first accommodating portion 251A in the Y axis direction.

As illustrated in FIGS. 7 and 9, the fifth protrusion 304E has a second supply communication portion 306B that is a hole constituting the second gas supply passage 32B through which gas is supplied to the second accommodating portion 251B. The second supply communication portion 306B extends axially through the fifth protrusion 304E. In short, the fifth protrusion 304E has a tubular shape and protrudes from the main body 302. The second supply communication portion 306B is coupled to the second accommodating portion 251B of the case 250. Furthermore, the second supply communication portion 306B extends through the main body 302 in addition to the fifth protrusion 304E and opens in the second mounting portion 301B. The second supply communication portion 306B is coupled, at an end adjacent to the second mounting portion 301B, to the second gas introduction portion 322B of the third tubular portion 323C.

The third tubular portion 323C having the second gas introduction portion 322B is away from the second accommodating portion 251B in the +X direction of the X axis direction. In this configuration, the fifth protrusion 304E having the second supply communication portion 306B is tilted with respect to the Z axis direction or the direction in which the third tubular portion 323C having the second gas introduction portion 322B extends. In this embodiment, the fifth protrusion 304E is tilted downward toward the center in the X axis direction of the supply passage member 30.

Furthermore, in this embodiment, the fifth protrusion 304E extends, in a top view of FIG. 3, in the X axis direction substantially parallel to the second protrusion 304B, for example. The second supply communication portion 306B is coupled to an end portion in the −Y direction of the second accommodating portion 251B in the Y axis direction.

The sixth protrusion 304F has a second exhaust communication portion 307B that is a hole constituting the second gas exhaust passage 33B through which gas in the second accommodating portion 251B is discharged outside. The second exhaust communication portion 307B extends axially through the sixth protrusion 304F. In short, the sixth protrusion 304F has a tubular shape and protrudes from the main body 302. The second exhaust communication portion 307B is coupled to the second accommodating portion 251B of the case 250. Furthermore, the second exhaust communication portion 307B extends through the main body 302 in addition to the sixth protrusion 304F and opens in the second mounting portion 301B. The second exhaust communication portion 307B is coupled, at an end adjacent to the second mounting portion 301B, to the second gas exhaust portion 324B of the fourth tubular portion 323D.

The fourth tubular portion 323D having the second gas exhaust portion 324B is away from the second accommodating portion 251B in the +X direction of the X axis direction. In this configuration, the sixth protrusion 304F having the second exhaust communication portion 307B is tilted with respect to the Z axis direction or the direction in which the fourth tubular portion 323D having the second gas exhaust portion 324B extends. In this embodiment, as the fifth protrusion 304E, the sixth protrusion 304F is tilted downward toward the center in the X axis direction of the supply passage member 30.

Furthermore, in this embodiment, the sixth protrusion 304F extends, in a top view of FIG. 3, in the X axis direction substantially parallel to the second protrusion 304B, for example. The second exhaust communication portion 307B is coupled to an end portion in the +Y direction of the second accommodating portion 251B in the Y axis direction.

In the supply passage member 30 having such a configuration, although not illustrated in the drawings, the first ink supply needle 321A and the second ink supply needle 321B are coupled to the liquid container 2 through supply tubes, for example. The ink in the liquid container 2 is supplied to the first ink supply needle 321A and the second ink supply needle 321B through the supply tubes. An adjuster that adjusts the ink pressure may be disposed between the first and second ink supply needles 321A and 321B and the liquid container 2.

Furthermore, the first gas introduction portion 322A of the first tubular portion 323A and the second gas introduction portion 322B of the third tubular portion 323C are coupled to the gas sending mechanism 50 included in the recording apparatus 1. The gas sending mechanism 50 is coupled to the first and second gas supply passages 32A and 32B of the supply passage member 30 and sends cooling gas to the first and second gas supply passages 32A and 32B.

In this embodiment, the gas sending mechanism 50 includes a gas storage 51 that stores gas. The first gas introduction portion 322A and the second gas introduction portion 322B are coupled to the gas storage 51 through a gas supply tube 52. In other words, the gas supply tube 52 extending from the gas storage 51 is coupled to each of the first tubular portion 323A and the third tubular portion 323C.

Although not illustrated in the drawings, the gas storage 51 includes a temperature regulator that controls the temperature of gas in the gas storage 51. The temperature regulator includes, for example, a temperature sensor that determines the temperature of gas in the gas storage 51, a cooler that cools the inside of the gas storage 51, and a controller that drives the cooler to cool the gas in the gas storage 51 to a predetermined temperature. The gas sending mechanism 50 is configured to send cooling gas having a temperature controlled in the gas storage 51 to the first and second gas introduction portions 322A and 322B through the gas supply tube 52. The controller and the control unit 3 may be either different components or one component. Furthermore, the temperature regulator may be positioned outside the gas storage 51 and may be positioned between the gas storage 51 and the recording head 10. Furthermore, the recording apparatus 1 does not necessarily have to include the temperature regulator.

The gas storage 51 and the first and second gas introduction portions 322A and 322B are hermetically coupled together by the gas supply tube 52. Thus, the gas sending mechanism 50 reliably sends gas in the gas storage 51 to the first and second gas introduction portions 322A and 322B.

The gas sending mechanism 50 according to this embodiment includes a gas sending pump 53 along the gas supply tube 52 and uses the gas sending pump 53 to send the gas in the gas storage 51 to the first and second gas introduction portions 322A and 322B. The gas sending mechanism 50 can send any gas. Examples of the gas include air and inert gases such as argon and nitrogen. In particular, gas is preferably a dry gas that has a water vapor content of not greater than 4 $g/m^3$. The water vapor content of the dry gas is more preferably not greater than 3 $g/m^3$ and still more preferably not greater than 1 $g/m^3$.

Figure 10:
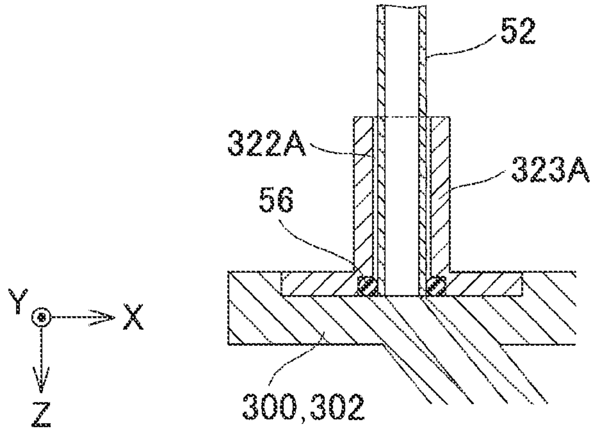
FIG. 10 is a magnified cross-sectional view illustrating a schematic configuration of the recording head according to the first embodiment of the present disclosure.
Figure 11:
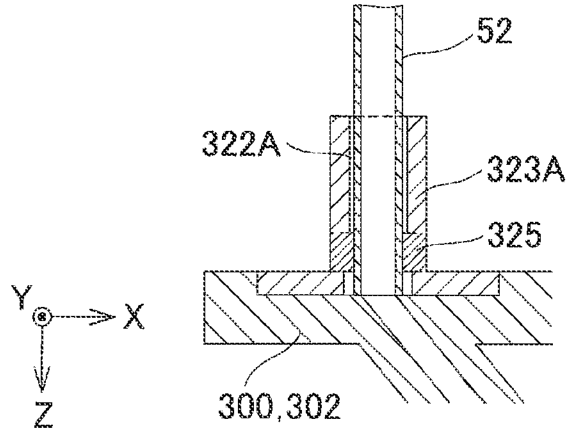
FIG. 11 is a magnified cross-sectional view illustrating a schematic configuration of the recording head according to the first embodiment of the present disclosure.
Figure 12:
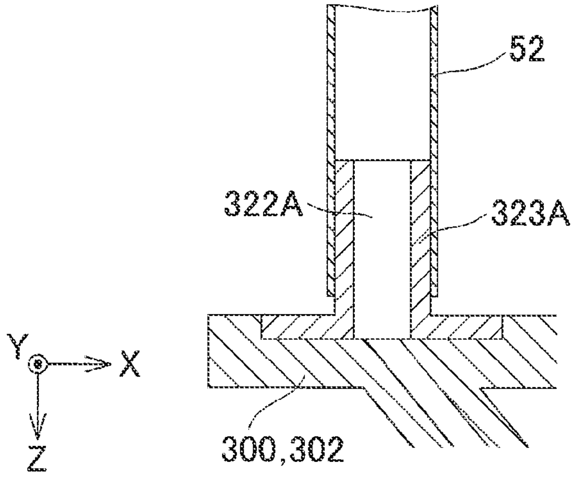
FIG. 12 is a magnified cross-sectional view illustrating a schematic configuration of the recording head according to the first embodiment of the present disclosure.

Any method may be employed to couple the gas supply tube 52 to the first and third tubular portions 323A and 323C. The followings are examples of the method. FIGS. 10 to 12 are magnified cross-sectional views illustrating a method of coupling the gas supply tube 52 to the first tubular portion 323A.

First, as illustrated in FIG. 10, the gas supply tube 52 is a tube having an outer diameter slightly smaller than the inner diameter of the first gas introduction portion 322A and slightly larger than the inner diameter of an O-ring 56, which is disposed between the first tubular portion 323A and the main body 302. Furthermore, a front end of the gas supply tube 52 or at least a portion of the gas supply tube 52 that is inserted into the O-ring 56 is formed of a rigid material. The front-end portion of the gas supply tube 52 inserted into the first gas introduction portion 322A is press-fitted into the O-ring 56. Thus, the gas supply tube 52 and the first gas introduction portion 322A are hermetically coupled together and the gas supply tube 52 is held by the O-ring 56.

The gas supply tube 52 may have an outer diameter slightly smaller than the inner diameter of the first gas introduction portion 322A and may have a front end formed of a flexible material. In such a case, as illustrated in FIG. 11, the first tubular portion 323A may have a small diameter portion 325, at a position in the Z axis direction, in which the inner diameter of the first gas introduction portion 322A is slightly smaller than the outer diameter of the gas supply tube 52. The gas supply tube 52 is press-fitted into the small diameter portion 325 to hermetically couple the gas supply tube 52 and the first gas introduction portion 322A together.

In such a case, the inner diameter of the small diameter portion 325 may gradually decrease toward the first member 300. In other words, the small diameter portion 325 may have a tapered inner surface. With this configuration, the gas supply tube 52 is readily inserted into the small diameter portion 325.

Alternatively, as illustrated in FIG. 12, the gas supply tube 52 may be a tube having an inner diameter slightly smaller than the outer diameter of the first tubular portion 323A, and the gas supply tube 52 may be fitted on the outer surface of the first tubular portion 323A. In other words, the first tubular portion 323A may be press-fitted into the gas supply tube 52. With this configuration, the gas supply tube 52 and the first gas introduction portion 322A are hermetically coupled together.

Furthermore, the gas storage 51 is coupled to the first gas exhaust portion 324A and the second gas exhaust portion 324B through gas exhaust tubes 54. The gas storage 51 is hermetically coupled to the first gas exhaust portion 324A and the second gas exhaust portion 324B through the gas exhaust tubes 54. With this configuration, the gas sending mechanism 50 sends the gas discharged from the first gas exhaust portion 324A and the second gas exhaust portion 324B into the gas storage 51 through the gas exhaust tubes 54.

The gas sending mechanism 50 of this embodiment includes a gas exhaust pump 55 along the gas exhaust tube 54 and uses the gas exhaust pump 55 to send the gas discharged from the first and second gas exhaust portions 324A and 324B into the gas storage 51.

Any method may be employed to couple the gas exhaust tube 54 to the second and fourth tubular portions 323B and 323D. The method employed for the gas supply tube 52 may be employed.

In the recording apparatus 1 according to this embodiment, the gas sending mechanism 50 having the above-described configuration forces the cooling gas to circulate in the recording head 10 at a predetermine time.

Specifically described, the gas sending mechanism 50 supplies cooling gas into the accommodating portion 251 through the gas supply passage 32 as indicated by an arrow in FIG. 3 and discharges the gas in the accommodating portion 251 to the outside through the gas exhaust passage 33.

This generates a flow of gas in each accommodating portion 251, and the flow of gas cools the actuator units 230 in the respective accommodating portions 251. Furthermore, the cooling gas is directly supplied to the accommodating portion 251 through the gas supply passage 32, and thus the actuator unit 230 is more efficiently cooled. This reduces an increase in temperature of the recording head 10, reducing the possibility that ejection properties will be changed by a decreased viscosity of ink, which may result from the increase in temperature and lead to a decrease in printing quality.

Here, in the actuator units 230, the temperature of the drive circuits 241 (241A and 241B) is readily increased. Thus, the temperature of the recording head 10 is more likely to increase in the configuration that has the drive circuit 241 in the accommodating portion 251 or in the recording head 10.

However, the above-described configuration forces the cooling gas to circulate in the accommodating portion 251, and thus an increase in temperature of the drive circuit 241 is efficiently reduced. This reduces an increase in temperature of the recording head 10 caused by, for example, heat generated by the drive circuit 241. Thus, a decrease in throughput of the printing operation is reduced.

Furthermore, in this embodiment, the communication portion through which the gas supply passage 32 and the gas exhaust passage 33 are in communication with the accommodating portion 251 is surrounded by the second member 310 included in the supply passage member 30. This configuration reduces leakage of the gas, which is to be supplied into the accommodating portion 251 through the gas supply passage 32, to the outside, and thus cooling gas is more efficiently supplied to the accommodating portion 251. With this configuration, the actuator unit 230 including the drive circuit 241 is more reliably cooled.

Furthermore, the second member 310 reduces the possibility that the mist of ink ejected from the recording head 10 and floating in the recording apparatus 1 will enter the accommodating portion 251. Furthermore, the second member 310 reduces a change in temperature in the recording apparatus 1 caused by leakage of the cooling gas in the accommodating portion 251 to the outside of the recording head 10. The printing operation is less likely to be adversely affected by the change in temperature.

The space between the second member 310 and the case 250 may be sealed or a small space of, for example, about 0.3 mm may be left therebetween. The space reduces an excessive increase in pressure in the accommodating portion 251. The space having such a size allows only a limited amount of gas to leak from the accommodating portion 251 to the outside of the recording head 10, and thus a temperature change in the recording apparatus 1 is kept sufficiently small. Furthermore, when the pressure in the accommodating portion 251 is positive, the mist of ink is less likely to enter even if a small space is formed between the second member 310 and the case 250.

Furthermore, the gas sending mechanism 50 of the present embodiment circulates the cooling gas. Specifically described, the gas in the gas storage 51 is sent into the accommodating portion 251 through the gas supply tube 52 and the gas supply passage 32, and the gas in the accommodating portion 251 is collected into the gas storage 51 through the gas exhaust passage 33 and the gas exhaust tube 54, and then the collected gas is supplied again to the accommodating portion 251. This reduces the possibility that the mist of ink or foreign substances outside the recording head 10 (for example, dusts such as paper dust) will be mixed into the cooling gas. Thus, gas containing no foreign substances and containing no mist of ink is supplied into the accommodating portion 251. This reduces the possibility that a breakdown of the recording head 10 will be caused by foreign substances or mist of ink.

In particular, the configuration in which the gas supply tube 52 and the gas introduction portion 322 are hermetically coupled together and the gas exhaust tube 54 and the gas exhaust portion 324 are hermetically coupled together more reliably reduces the possibility that mist of ink or outside foreign substances will be mixed into the cooling gas. Furthermore, the configuration in which the gas exhaust tube 54 and the gas exhaust portion 324 are hermetically coupled together reduces the possibility that the gas supplied into the accommodating portion 251 will be discharged to a space outside the recording head 10 but inside the recording apparatus 1, specifically a space where the recording head 10 performs a recording operation. This reduces the possibility that the gas discharged to the space outside the recording head 10 will cause flight deflection of the liquid ejected through the nozzle 218 and will change the temperature of the space in the recording apparatus 1.

The gas exhaust tube 54 may be eliminated. The gas in the accommodating portion 251 may be discharged outside the recording head 10 through the gas exhaust passage 33. Alternatively, the gas storage 51 may be eliminated. However, in such a case, the gas supply tube 52 may extend from an area having the fewest possible mist of ink, such as a space outside the casing (not illustrated) of the recording apparatus 1, to be coupled to the gas introduction portion 322.

Furthermore, in this embodiment, the first coupling unit 320A includes the first gas introduction portion 322A, the first ink supply needle 321A, and the first gas exhaust portion 324A arranged in this order from the +Y direction side. The second coupling unit 320B includes the second gas introduction portion 322B, the second ink supply needle 321B, and the second gas exhaust portion 324B in this order from the −Y direction side. The gas introduction portion 322, the gas exhaust portion 324, and the ink supply needle 321 are on an opposite side of the fixing plate 233 from the drive circuit 241 and are arranged in the longitudinal direction of the drive circuit 241 along the surface of the fixing plate 233.

In this embodiment, the fixing plate 233A is disposed between the first drive circuit 241A and the first gas introduction portion 322A, the first ink supply needle 321A, and the first gas exhaust portion 324A. The fixing plate 233A is formed of a metal material and is in contact with the first drive circuit 241A, and thus the heat of the first drive circuit 241A is readily transmitted to the fixing plate 233A. Similarly, the fixing plate 233B is disposed between the second drive circuit 241B and the second gas introduction portion 322B, the second ink supply needle 321B, and the second gas exhaust portion 324B. The fixing plate 233B is formed of a metal material and is in contact with the second drive circuit 241B, and thus the heat of the second drive circuit 241B is readily transmitted to the fixing plate 233B.

Thus, generation of a flow of gas in the accommodating portion 251 along the surface of the fixing plate 233 in the longitudinal direction of the drive circuit 241 efficiently cools the drive circuit 241 through the fixing plate 233. Furthermore, the gas introduction portion 322, the gas exhaust portion 324, and the ink supply needle 321 arranged as above effectively use the space, reducing an increase in size in the X axis direction of the recording head 10.

Furthermore, as described above, the first tubular portion 323A having the first gas introduction portion 322A, the first ink supply needle 321A, and the second tubular portion 323B having the first gas exhaust portion 324A are arranged in this order from the +Y direction side to the −Y direction side. In contrast, the third tubular portion 323C having the second gas introduction portion 322B, the second ink supply needle 321B, and the fourth tubular portion 323D having the second gas exhaust portion 324B are arranged in this order from the −Y direction side to the +Y direction side. The vibration plate 212 that defines the first accommodating portion 251A, to which the first gas introduction portion 322A and the first gas exhaust portion 324A are coupled, and the second accommodating portion 251B, to which the second gas introduction portion 322B and the second gas exhaust portion 324B are coupled, is shared by the first and second accommodating portions 251A and 251B.

This configuration having the first gas introduction portion 322A on one side in the Y axis direction and the second gas introduction portion 322B on the other side in the Y axis direction reduces a stress concentration on the vibration plate 212, which will be caused by pressure of gas supplied from the first and second gas introduction portions 322A and 322B to the accommodating portion 251. Thus, the vibration plate 212 is less likely to be detached from the case 250. Additionally, variations in ejecting properties are reduced.

The recording heads 10 having the above-described configuration are arranged in the head unit 100. The arrangement of the recording heads 10 in the head unit 100 is not limited but the recording heads 10 may be arranged as below.

In each recording head 10, as described above, the first gas introduction portion 322A and the second gas exhaust portion 324B are disposed at one end in the Y axis direction and the first gas exhaust portion 324A and the second gas introduction portion 322B are arranged side by side at the other end in the Y axis direction.

Figure 13:
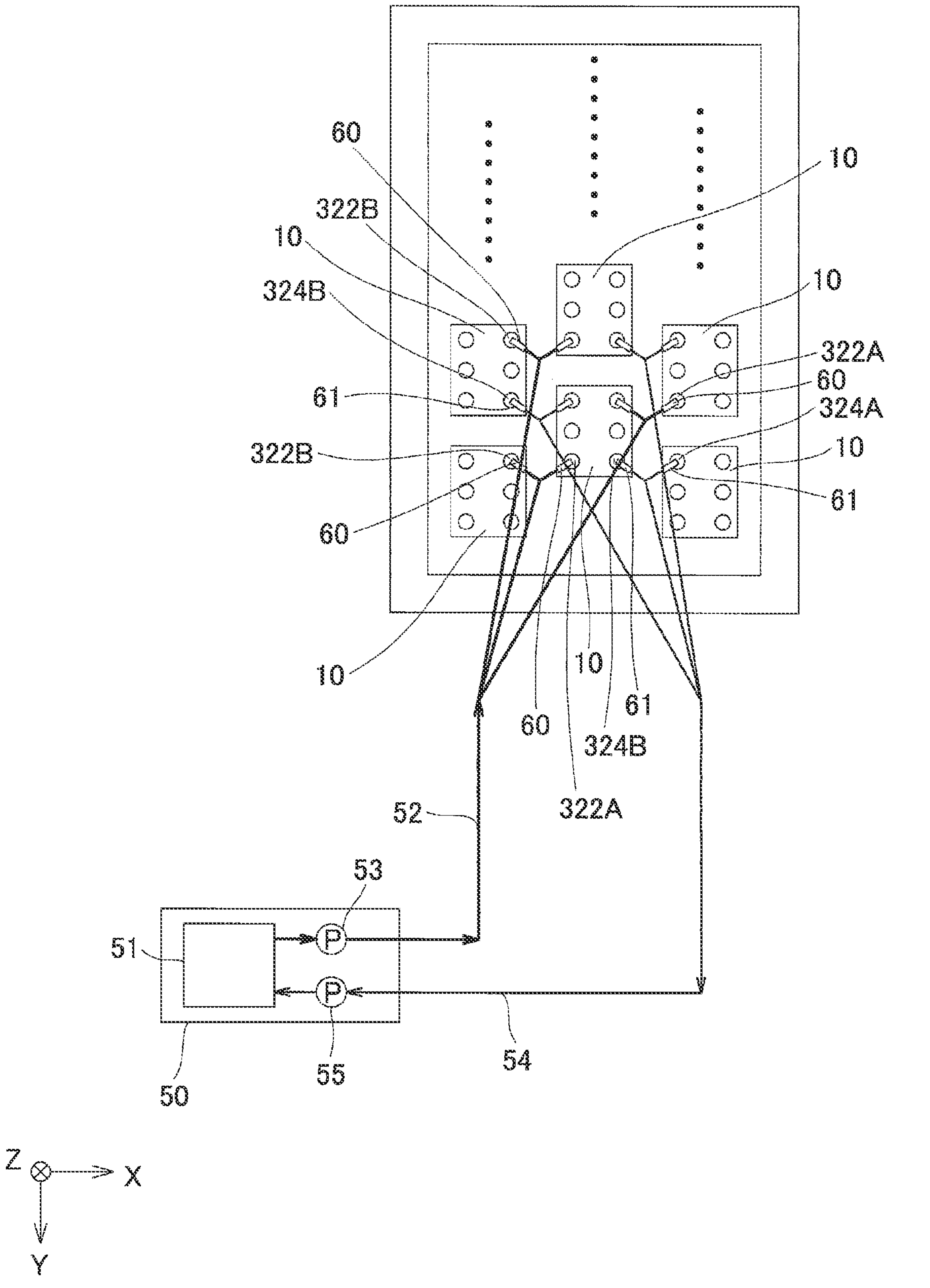
FIG. 13 is a schematic view illustrating a head unit according to the first embodiment of the present disclosure.

In the head unit 100, as illustrated in FIG. 13, the recording heads 10 may be staggered such that the first gas introduction portion 322A of a recording head 10 is located close to the gas introduction portion 322B of an adjacent recording head 10 and the first gas exhaust portion 324A of a recording head 10 is located close to the second gas exhaust portion 324B of an adjacent recording head 10.

The first gas introduction portion 322A and the second gas introduction portion 322B are each coupled to the gas supply tube 52 through a coupling 60. Similarly, the first gas exhaust portion 324A and the second gas exhaust portion 324B are each coupled to the gas exhaust tube 54 through a coupling 61.

Since the first and second gas introduction portions 322A and 322B are adjacent to be positioned close to each other, the couplings 60 coupled to the first and second gas introduction portions 322A and 322B are positioned close to each other. Thus, the gas supply tube 52 coupled to the first and second gas introduction portions 322A and 322B remains unbranched to a position near the couplings 60. Similarly, since the first and second gas exhaust portions 324A and 324B are adjacent to be positioned close to each other, the gas exhaust tube 54 remains unbranched to a position near the coupling 61.

This configuration reduces the length of the gas supply tube 52 and the gas exhaust tube 54 to be used, leading to a reduction in cost. Furthermore, this configuration makes the arrangement of the gas supply tube 52 and the gas exhaust tube 54 easy, enabling various layouts of the gas supply tube 52 and the gas exhaust tube 54.

In FIG. 13, only the gas supply tube 52 that is coupled to the adjacent first and second gas introduction portions 322A and 322B and the gas exhaust tube 54 that is coupled to the adjacent first and second gas exhaust portions 324A and 324B are illustrated. However, the gas supply tube 52 is coupled to all the first gas introduction portions 322A and all the second gas introduction portions 322B, and the gas exhaust tube 54 is coupled to all the first gas exhaust portion 324A and all the second gas exhaust portion 324B.

Second Embodiment

Figure 14:
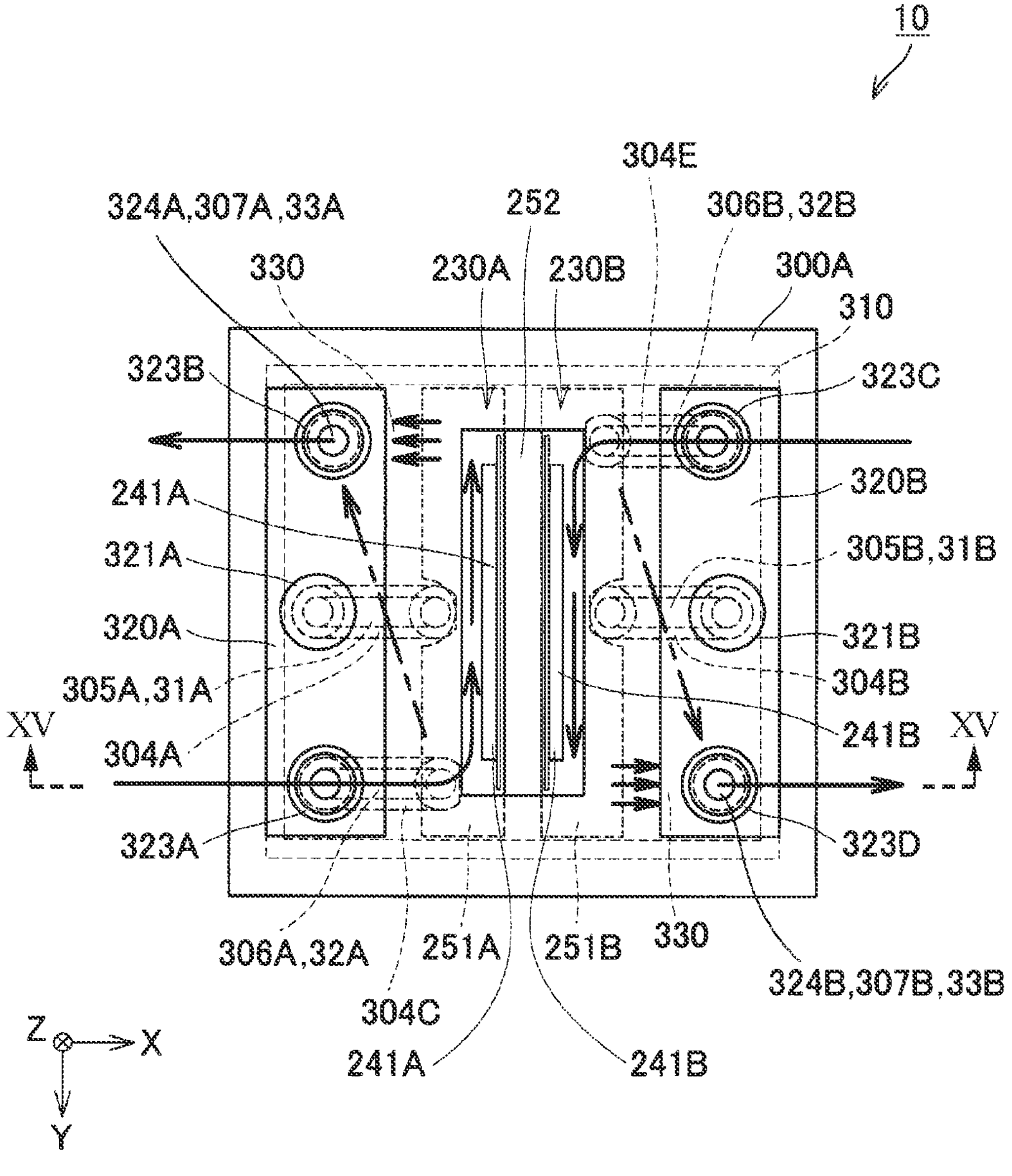
FIG. 14 is a top view illustrating a schematic configuration of a recording head according to a second embodiment of the present disclosure.
Figure 15:
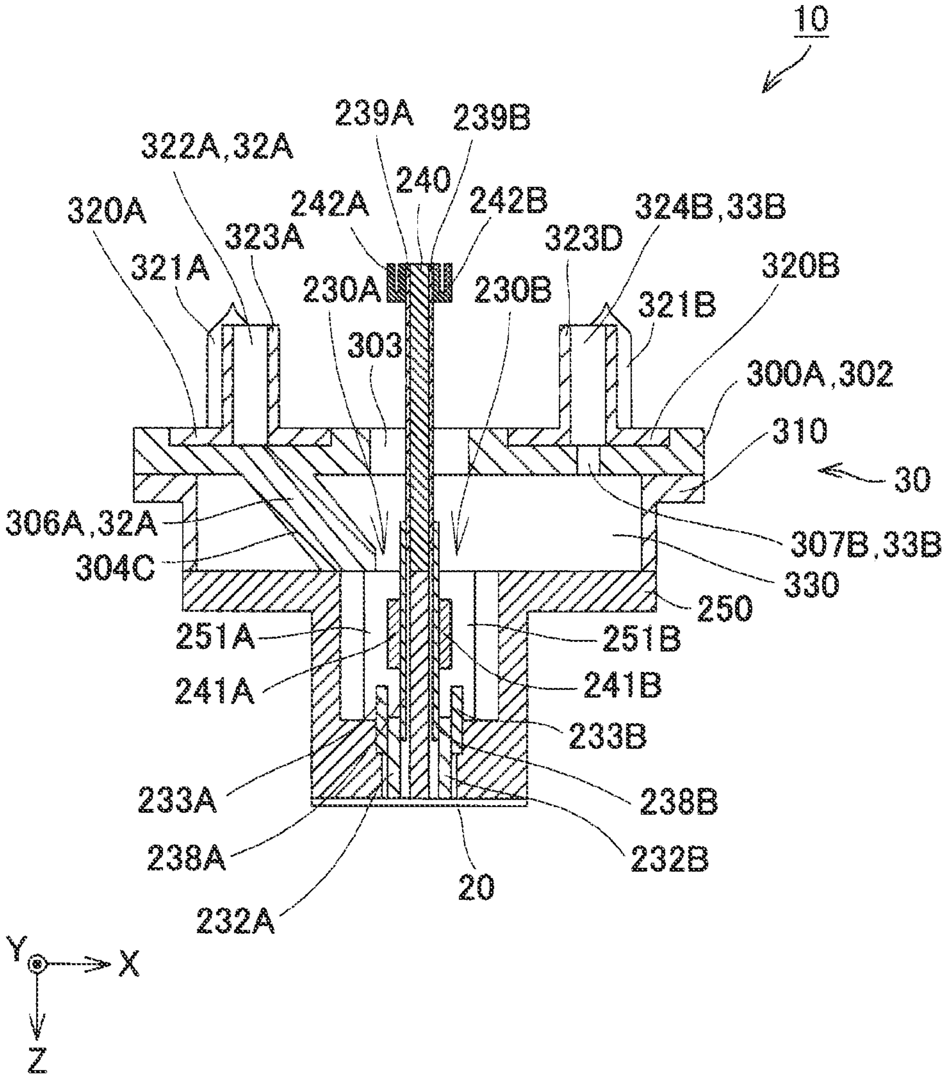
FIG. 15 is a cross-sectional view illustrating a schematic configuration of the recording head according to the second embodiment of the present disclosure.

FIG. 14 is a top view illustrating a recording head 10 according to a second embodiment. FIG. 15 is a cross-sectional view taken along line XV-XV in FIG. 14. In FIG. 14, the wiring member 239 and the holder 240 are not illustrated. In the drawings, the same reference numerals are assigned to the same components as the first embodiment without duplicated explanation.

In this embodiment, the fixing plates 233A and 233B and the first and second gas exhaust passages 33A and 33B are modified and the other components are the same as those in the first embodiment.

As described above, in the first embodiment, the fixing plate 233A is in contact with the first drive circuit 241A and the fixing plate 233B is in contact with the second drive circuit 241B (see FIGS. 3, 4, 5, and 7, for example).

In contrast, as illustrated in FIGS. 14 and 15, in this embodiment, a fixing plate 233A is not in contact with the first drive circuit 241A and a fixing plate 233B is not in contact with the second drive circuit 241B. In this embodiment, the end in the −Z direction of each of the fixing plates 233 is away from the drive circuit 241 in the +Z direction. In other words, the surface of the first drive circuit 241A facing in the −X direction faces the inside of the first accommodating portion 251A and the surface of the second drive circuit 241B facing in the +X direction faces the inside of the second accommodating portion 251B.

Furthermore, as described above, the first member 300 according to the first embodiment includes the fourth protrusion 304D having the first exhaust communication portion 307A and the sixth protrusion 304F having the second exhaust communication portion 307B (see FIG. 3, for example).

In contrast, as illustrated in FIGS. 14 and 15, in this embodiment, a first member 300A does not have the fourth and sixth protrusions 304D and 304F. The first and second exhaust communication portions 307A and 307B extend only through the main body 302 of the first member 300A in the Z axis direction.

As indicated by arrows in FIG. 14, this configuration also generates a flow of gas along the surface of the first drive circuit 241A in the longitudinal direction of the first drive circuit 241A, and thus the first drive circuit 241A is efficiently cooled.

Furthermore, this configuration generates a flow of gas in the longitudinal direction of the second drive circuit 241B along the surface of the second drive circuit 241B, and thus the second drive circuit 241B is efficiently cooled.

Furthermore, in this embodiment, the gas in the first accommodating portion 251A is also collected into the gas storage 51 through the first gas exhaust passage 33A, which has the first exhaust communication portion 307A and the first gas exhaust portion 324A, and the gas exhaust tube 54. Similarly, the gas in the second accommodating portion 251B is collected into the gas storage 51 through the second gas exhaust passage 33B, which has the second exhaust communication portion 307B and the second gas exhaust portion 324B, and the gas exhaust tube 54.

However, since the first member 300A does not have the fourth and sixth protrusions 304D and 304F, a space 330 is left between the first accommodating portion 251A and the first exhaust communication portion 307A and between the second accommodating portion 251B and the second exhaust communication portion 307B.

In this configuration, the gas in the first accommodating portion 251A discharged into the space 330 is collected into the gas storage 51 through the first gas exhaust passage 33A, which has the first exhaust communication portion 307A and the first gas exhaust portion 324A, and the gas exhaust tube 54. Similarly, the gas in the second accommodating portion 251B discharged into the space 330 is collected into the gas storage 51 through the second gas exhaust passage 33B, which has the second exhaust communication portion 307B and the second gas exhaust portion 324B, and the gas exhaust tube 54.

Furthermore, as indicated by a dashed arrow in FIG. 14, this configuration not having the fourth protrusion 304D further generates a flow of gas traveling from the opening of the first supply communication portion 306A adjacent to the first accommodating portion 251A toward the first exhaust communication portion 307A through the space 330. This flow of gas cools ink in the first through hole 305A of the first liquid supply passage 31A, further reducing a decrease in viscosity of ink. Furthermore, as indicated by a dashed arrow in FIG. 14, this configuration not having the sixth protrusion 304F further generates a flow of gas traveling from the opening of the second supply communication portion 306B adjacent to the second accommodating portion 251B toward the second exhaust communication portion 307B through the space 330. This flow of gas cools ink in the second through hole 305B of the second liquid supply passage 31B, further reducing a decrease in viscosity of ink.

The second member 310 is located between the case 250 and the first member 300 along the outer peripheries thereof. The space 330 defined between the first accommodating portion 251A and the first exhaust communication portion 307A and between the second accommodating portion 251B and the second exhaust communication portion 307B is virtually closed by the second member 310. The space 330 may be regarded as a portion of the first gas exhaust passage 33A and a portion of the second gas exhaust passage 33B.

Third Embodiment

Figure 16:
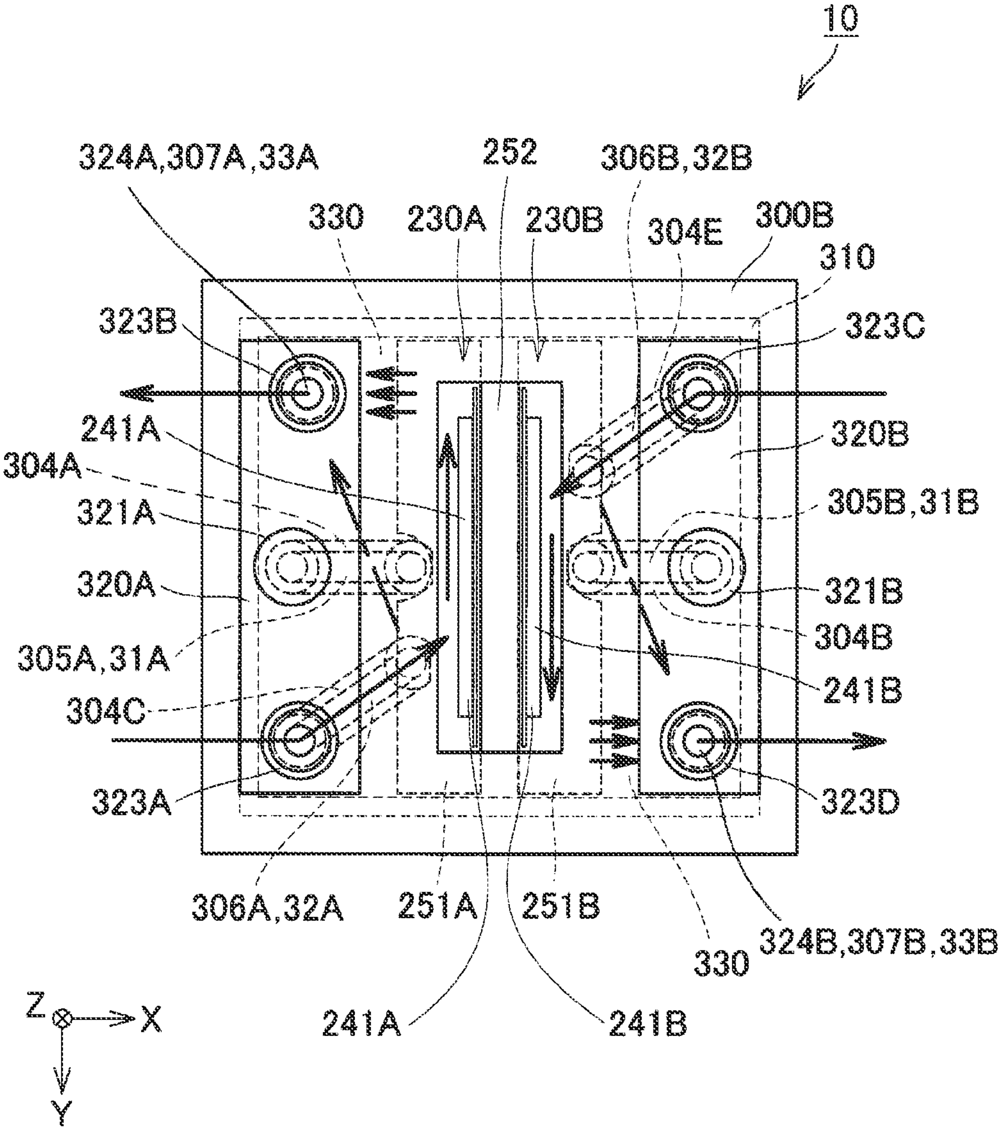
FIG. 16 is a top view illustrating a schematic configuration of the recording head according to a third embodiment of the present disclosure.

FIG. 16 is a top view illustrating a recording head 10 according to a third embodiment. In the drawings, the same reference numerals are assigned to the same components as the above-described embodiments without duplicated explanation.

In the first member 300B according to this embodiment, the third protrusion 304C having the first supply communication portion 306A and the fifth protrusion 304E having the second supply communication portion 306B are tilted downward toward the center in the X axis direction of the supply passage member 30 as those in the first embodiment. Furthermore, as illustrated in FIG. 16, the third protrusion 304C and the fifth protrusion 304E of the first member 300B are also tilted downward toward the center in the Y axis direction of the supply passage member 30, or toward the liquid supply passage 31.

The first drive circuit 241A is disposed on an extension of the first supply communication portion 306A of the third protrusion 304C. Similarly, the second drive circuit 241B is disposed on an extension of the second supply communication portion 306B of the fifth protrusion 304E.

With this configuration, the cooling gas is sent around the first drive circuit 241A and the second drive circuit 241B when the cooling gas is supplied to the first accommodating portion 251A and the second accommodating portion 251B, more reliably reducing an increase in temperature of the first and second drive circuits 241A and 241B. As in the first embodiment, the drive circuit 241 and the fixing plate 233 may be in contact with each other, i.e., the fixing plate 233 may be disposed between the supply communication portion 306 and the drive circuit 241. In such a case, when the fixing plate 233 is formed of a material having a thermal conductivity of not less than 10.0 W/m·K, the heat of the drive circuit 241 is readily transmitted to the fixing plate 233. Thus, the same effect is achieved.

OTHER EMBODIMENTS

The embodiments according to the present disclosure are described above. However, the present disclosure is not limited to the above-described embodiments.

For example, in the above-described embodiments, the supply communication portion 306 constituting the gas supply passage 32 and the exhaust communication portion 307 constituting the gas exhaust passage 33, which are included in the supply passage member 30, are tilted with respect to the Z axis direction (see FIG. 7). However, the supply communication portion 306 and the exhaust communication portion 307 do not need to be tilted with respect to the Z axis direction and as illustrated in FIG. 17, each may have a portion positioned parallel to the Z axis direction and a portion positioned perpendicular to the Z axis direction.

Figure 17:
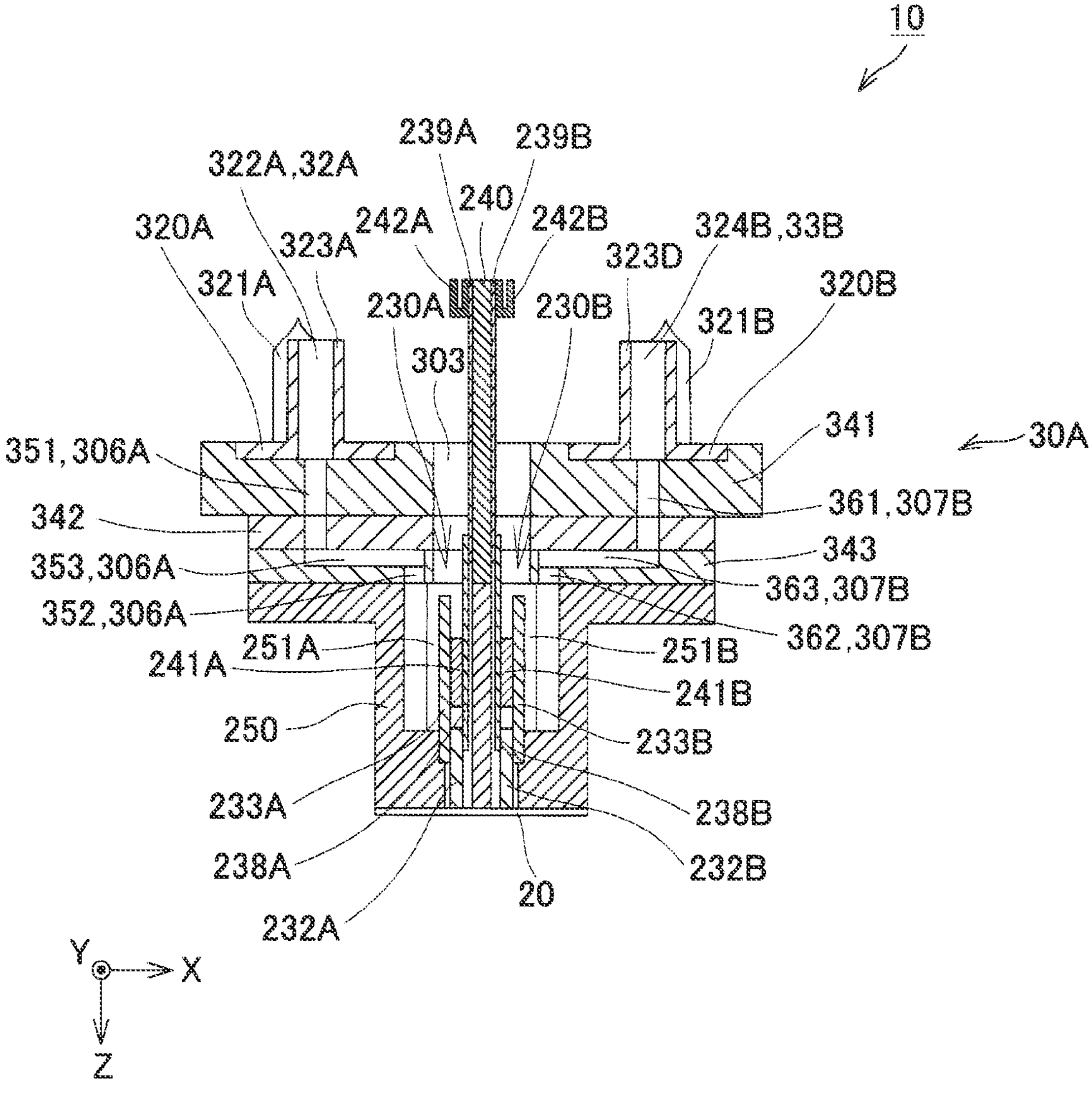
FIG. 17 is a cross-sectional view illustrating a schematic configuration of the recording head according to another embodiment of the present disclosure.

In an example illustrated in FIG. 17, the supply passage member 30A includes a first plate member 341, a second plate member 342, and a third plate member 343, which are stacked on top of another in the Z axis direction, and a coupling unit 320 mounted on the first plate member 341. The configuration illustrated in FIG. 17 is the same as that of the first embodiment except for the supply passage member 30A. The first and second coupling units 320A and 320B are mounted on the first plate member 341.

For example, the first supply communication portion 306A includes a first supply through portion 351 that extends through the first and second plate members 341 and 342 in the Z axis direction and is provided for the first gas introduction portion 322A, a second supply through portion 352 that extends through the third plate member 343 in the Z axis direction and is provided for the first accommodating portion 251A, and a supply groove 353 in the surface of the third plate member 343 adjacent to the second plate member 342 and through which the first supply through portion 351 and the second supply through portion 352 are in communication with each other.

Furthermore, for example, the second exhaust communication portion 307B includes a first gas exhaust through portion 361 that extends through the first and second plate members 341 and 342 in the Z axis direction and that is provided for the second gas exhaust portion 324B, a second gas exhaust through portion 362 that extends through the third plate member 343 in the Z axis direction and is provided for the second accommodating portion 251B, and a gas exhaust groove 363 in the surface of the third plate member 343 adjacent to the second plate member 342 and through which the first gas exhaust through portion 361 and the second gas exhaust through portion 362 are coupled to each other.

When the supply passage member 30A has the above-described configuration, the same effects as those in the above-described embodiments are certainly achieved.

In the examples of the above-described embodiments, the supply passage member 30 includes the first and second gas exhaust passages 33A and 33B. However, the first and second gas exhaust passages 33A and 33B may be eliminated from the supply passage member 30. In such a case, for example, the cooling gas supplied from the gas supply passage 32 to the accommodating portion 251 may be discharged outside the recording head 10 through at least one of the space between the first member 300 and the second member 310, the space between the case 250 and the second member 310, and the insertion hole 303. Even with this configuration, the drive circuit 241 housed in the recording head 10 is cooled.

Furthermore, in the above-described embodiments, as an example of the drive element that changes the pressure of the pressure chamber, a longitudinal vibration piezoelectric actuator is used in which piezoelectric bodies and electrode formation materials are alternately laminated to axially expand and contract. However, as long as the recording head houses the drive circuit, the type of drive element is not limited. The drive element may be a flexural vibration piezoelectric actuator such as a thin-film piezoelectric actuator, in which electrodes and piezoelectric materials are laminated by a film forming process and a lithography process, and a thick-film piezoelectric actuator, which is formed by, for example, attaching a green sheet. Alternatively, the drive element may be a heating element provided for each of the pressure chambers. Bubbles generated by heat of the heating element cause ejection of liquid droplets through the nozzle. Alternatively, the drive element may be an electrostatic actuator that generates static electricity between the vibration plate and the electrode. The electrostatic force deforms the vibration plate to cause ejection of liquid droplets through the nozzle.

Furthermore, in the above-described embodiments, the ink jet recording apparatus in which the recording head mounted on the carriage is moved in a main scanning direction is described as an example. However, the movement direction of the ink jet recording apparatus is not limited to this. For example, the present disclosure is applicable to a line recording apparatus in which a recording head is fixed and printing is performed by only moving a recording sheet such as paper in a sub scanning direction.

In the above-described embodiments, an ink jet recording head is described as an example of the liquid ejecting head, and an ink jet recording apparatus is described as an example of the liquid ejecting apparatus. However, the present disclosure is widely intended for general liquid ejecting heads and general liquid ejecting apparatus and is certainly applicable to a liquid ejecting head and a liquid ejecting apparatus that eject liquid other than ink. Examples of the other liquid ejecting heads include various recording heads used in an image forming apparatus such as a printer, a color material ejecting head used in manufacturing of a color filter of, for example, a liquid crystal display, an electrode material ejecting head used in formation of an electrode of an organic EL display or a field-emission display (FED), and a bio-organic material ejecting head used in manufacturing of biochips. The present disclosure is also applicable to a liquid ejecting apparatus including such a liquid ejecting head.

What is claimed is:

1. A liquid ejecting head comprising:

a first drive circuit including a switching element that selects, from a plurality of drive elements, a drive element to which a drive signal for ejection of liquid through a nozzle is sent;

a case defining a first accommodating portion that is a space accommodating the first drive circuit;

a first gas supply passage that is in communication with the first accommodating portion and through which gas is supplied to the first accommodating portion; and a first liquid supply passage to which liquid is supplied from outside, wherein at least a portion of the first gas supply passage and at least a portion of the first liquid supply passage are defined by a common member.

2. The liquid ejecting head according to claim 1, further comprising a first gas exhaust passage that is in communication with the first accommodating portion and through which gas in the first accommodating portion is discharged outside, wherein at least a portion of the first gas exhaust passage is defined by the common member.

3. The liquid ejecting head according to claim 2, wherein the first gas supply passage, the first liquid supply passage, and the first gas exhaust passage are arranged in this order in a longitudinal direction of the first drive circuit, and at least a portion of the first gas exhaust passage is overlapped with at least a portion of the first liquid supply passage when viewed in the longitudinal direction of the first drive circuit.

4. The liquid ejecting head according to claim 3, further comprising:

a second drive circuit including a switching element that selects, from a plurality of drive elements, a drive element to which a drive signal for ejection of liquid through a nozzle is sent;

a second accommodating portion that is a space defined by the case, separated from the first accommodating portion by a partition wall, and accommodating the second drive circuit;

a second gas supply passage that is in communication with the second accommodating portion and through which gas is supplied from outside to the second accommodating portion;

a second gas exhaust passage that is in communication with the second accommodating portion and through which gas in the second accommodating portion is discharged outside; and a second liquid supply passage to which liquid is supplied from outside, wherein a direction in which the second gas supply passage, the second liquid supply passage, and the second gas exhaust passage are arranged is opposite to a direction in which the first gas supply passage, the first liquid supply passage, and the first gas exhaust passage are arranged.

5. The liquid ejecting head according to claim 4, further comprising a vibration plate defining the first accommodating portion and the second accommodating portion and shared by the first accommodating portion and the second accommodating portion.

6. The liquid ejecting head according to claim 1, further comprising a first member fixed to the case and having at least a portion of the first gas supply passage; and a second member disposed between the first member and the case and surrounding the first accommodating portion and a communication portion through which the first accommodating portion is in communication with the first gas supply passage.

7. The liquid ejecting head according to claim 1, wherein the first gas supply passage has a first gas introduction portion constituting an inlet through which gas is introduced from outside and a first supply communication portion through which the first gas introduction portion and the first accommodating portion are coupled together, the first supply communication portion is tilted with respect to a direction in which the first gas introduction portion extends, and the first drive circuit is disposed on an extension of the first supply communication portion.

8. The liquid ejecting head according to claim 1, wherein the accommodating portion further accommodates the plurality of drive elements.

9. The liquid ejecting head according to claim 1, further comprising:

a second drive circuit including a switching element that selects, from a plurality of drive elements, a drive element to which a drive signal for ejection of liquid through a nozzle is sent;

a second accommodating portion that is a space defined by the case, separated from the first accommodating portion by a partition wall, and accommodating the second drive circuit; and a second gas supply passage that is in communication with the second accommodating portion and through which gas is supplied from outside to the second accommodating portion.

10. A liquid ejecting apparatus comprising:

a liquid ejecting head comprising:

a first drive circuit including a switching element that selects, from a plurality of drive elements, a drive element to which a drive signal for ejection of liquid through a nozzle is sent;

a case defining a first accommodating portion that is a space accommodating the first drive circuit; and a first gas supply passage that is in communication with the first accommodating portion and through which gas is supplied to the first accommodating portion, and a gas sending mechanism coupled to the first gas supply passage and configured to send gas to the first gas supply passage, wherein the gas sending mechanism includes a gas storage configured to store gas to be sent to the first gas supply passage.

11. The liquid ejecting apparatus according to claim 10, wherein the gas storage and the first gas supply passage are hermetically coupled together.

12. The liquid ejecting apparatus according to claim 11, wherein the liquid ejecting head includes a first gas exhaust passage that is in communication with the first accommodating portion and through which gas in the first accommodating portion is discharged outside, the gas sending mechanism is coupled to the first gas exhaust passage in addition to the first gas supply passage, and the gas storage is configured to store gas to be sent to the first gas supply passage and gas discharged from the first accommodating portion through the first gas exhaust passage.

13. The liquid ejecting apparatus according to claim 10, wherein the liquid ejecting head includes a first gas exhaust passage that is in communication with the first accommodating portion and through which gas in the first accommodating portion is discharged outside, the gas sending mechanism is coupled to the first gas exhaust passage in addition to the first gas supply passage, and the gas storage is configured to store gas to be sent to the first gas supply passage and gas discharged from the first accommodating portion through the first gas exhaust passage.

14. The liquid ejecting apparatus according to claim 13, wherein the first gas exhaust passage and the gas storage are hermetically coupled together.

15. A liquid ejecting head comprising:

a first drive circuit including a switching element that selects, from a plurality of drive elements, a drive element to which a drive signal for ejection of liquid through a nozzle is sent;

a case defining a first accommodating portion that is a space accommodating the first drive circuit;

a first gas supply passage that is in communication with the first accommodating portion and through which gas is supplied to the first accommodating portion; and a first liquid supply passage to which liquid is supplied from outside, wherein the first gas supply passage has a first opening that is one end of the first gas supply passage, the other end of the first gas supply passage is coupled to the first accommodating portion, the first liquid supply passage has a second opening that opens to outside, and a direction that the first opening opens and a direction that the second opening opens are the same.

16. The liquid ejecting head according to claim 15, further comprising a first gas exhaust passage that is in communication with the first accommodating portion and through which gas in the first accommodating portion is discharged outside, wherein the first gas exhaust passage has a third opening that is one end of the first gas exhaust passage, the other end of the first gas exhaust passage is coupled to the first accommodating portion, and a direction that the third opening opens and the direction that the first opening opens are the same.

17. The liquid ejecting head according to claim 16, wherein at least a portion of the first gas exhaust passage has a tubular shape.

18. The liquid ejecting head according to claim 15, wherein the nozzle is configured to eject liquid in a direction that is opposite to the direction that the first opening opens.

19. The liquid ejecting head according to claim 15, wherein at least a portion of the first gas supply passage has a tubular shape.

20. The liquid ejecting head according to claim 15, wherein at least a portion of the first liquid supply passage has a tubular shape.

* * * * *